(12) United States Patent
Klassen

(10) Patent No.: US 6,923,055 B2
(45) Date of Patent: Aug. 2, 2005

(54) POSITIVE DISPLACEMENT FLOW METER METHOD AND APPARATUS

(75) Inventor: James B. Klassen, Irvine, CA (US)

(73) Assignee: Outland Technologies (USA) Inc., Calgary (CA)

( * ) Notice: Subject to any disclaimer, the term of this patent is extended or adjusted under 35 U.S.C. 154(b) by 0 days.

(21) Appl. No.: 10/802,493

(22) Filed: Mar. 16, 2004

(65) Prior Publication Data

US 2004/0250617 A1 Dec. 16, 2004

Related U.S. Application Data

(63) Continuation of application No. 09/924,374, filed on Aug. 8, 2001, now Pat. No. 6,705,161.
(60) Provisional application No. 60/223,870, filed on Aug. 8, 2000.

(51) Int. Cl.[7] .............................................. G01F 3/20
(52) U.S. Cl. ........................................................ 73/265
(58) Field of Search ............................. 73/261, 861.79, 73/861.88, 861.91, 26 J; 418/201.3, 206.5, 102; 384/123

(56) References Cited

U.S. PATENT DOCUMENTS

| 32,372 | A | 5/1861 | Jones |
|---|---|---|---|
| 351,129 | A | 10/1886 | Salomo |
| 914,155 | A | 3/1909 | Mills et al. |
| 991,576 | A | 5/1911 | White |
| 1,379,653 | A | 5/1921 | Shoemaker |
| 2,101,051 | A | 12/1937 | Cuny |
| 2,101,428 | A | 12/1937 | Cuny |
| 2,242,058 | A | 5/1941 | Cuny |
| 2,431,817 | A | 12/1947 | Mann |
| 3,101,700 | A | 8/1963 | Bowdish |
| 3,106,912 | A | 10/1963 | Kahlert |
| 3,156,222 | A | 11/1964 | Miller, Jr. |
| 3,236,186 | A | 2/1966 | Wildhaber |
| 3,272,130 | A | 9/1966 | Mosbacher |
| 3,816,038 | A | 6/1974 | Berry |
| 3,816,039 | A | 6/1974 | Berry |
| 3,856,440 | A | 12/1974 | Wildhaber |
| 5,755,196 | A | 5/1998 | Klassen |
| 6,036,463 | A | 3/2000 | Klassen |
| 6,705,161 | B1 * | 3/2004 | Klassen ........................ 73/261 |

FOREIGN PATENT DOCUMENTS

| CA | 2069607 | 11/1993 |
|---|---|---|
| DE | 1551081 | 4/1970 |
| DE | 2639760 | 3/1978 |
| DE | 3221994 | 12/1983 |
| FR | 916277 | 8/1946 |
| GB | 5686 | 11/1902 |
| GB | 805370 | 12/1958 |
| GB | 1099085 | 1/1968 |
| IT | 268459 | 1/1933 |
| JP | 43-29764 | 12/1943 |
| JP | 55-72683 | 5/1980 |
| WO | WO 99/61753 | 12/1999 |

OTHER PUBLICATIONS

Excerpt from a book titled Rotary Piston Machines by Felix Wankel, Classification of design principles for engines, pumps and compressors, 16 pages, 1965.
Granco Positive Displacement Rotary Pump product brochure, 6 pages, with attached article, Principles of operation and performance characteristics of Rotary Ball Pumps by Michael L. George, Challenge Manufacturing Co. Inc. Oakland, CA 4 pages, Plant Engineering Dec. 10, 1981.

* cited by examiner

Primary Examiner—Edward Lefkowitz
Assistant Examiner—Jewel V. Thompson
(74) Attorney, Agent, or Firm—Michael F. Hughes; Hughes Law Firm, PLLC

(57) ABSTRACT

A flow meter comprising a rotor assembly that is comprised of two rotors having axis of rotation offset from collinear where the two rotors define operating chambers that changing volume with respects to rotation and allow fluid to pass from an inlet port to an outlet port when the number of rotation is indicated the volumetric flow therethrough.

15 Claims, 18 Drawing Sheets

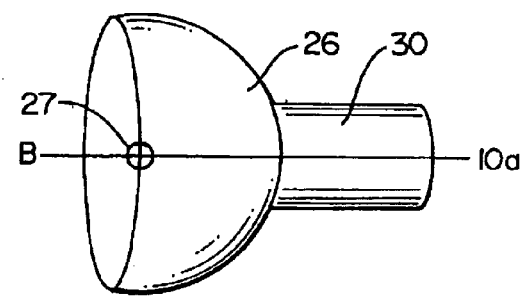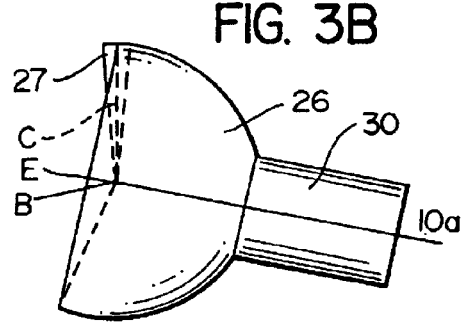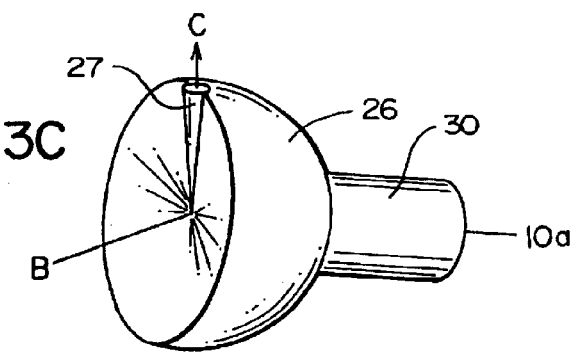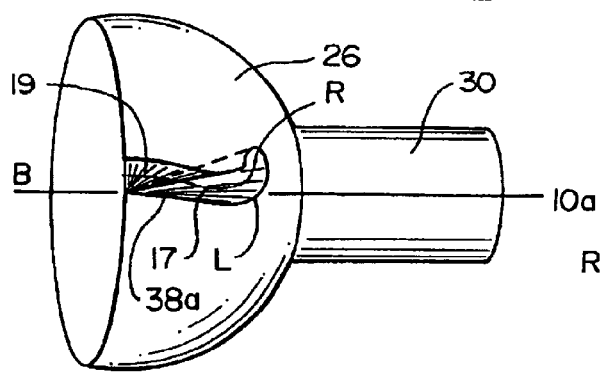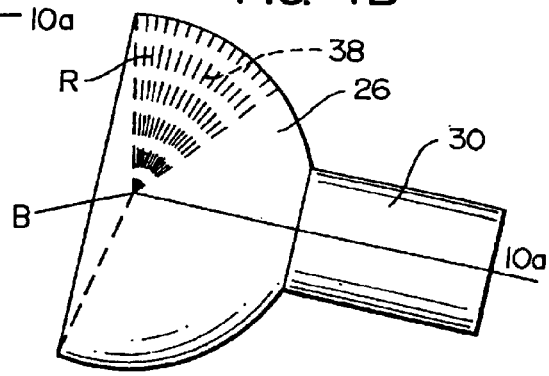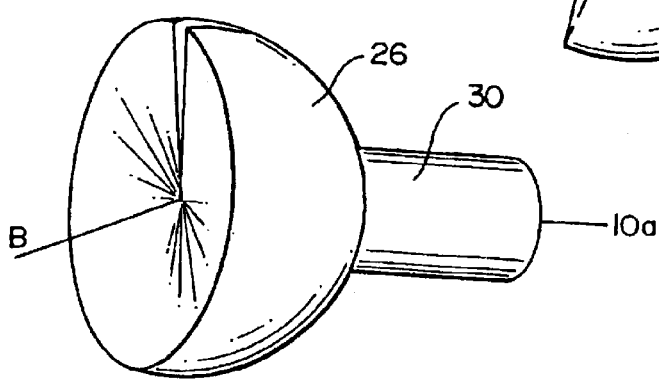

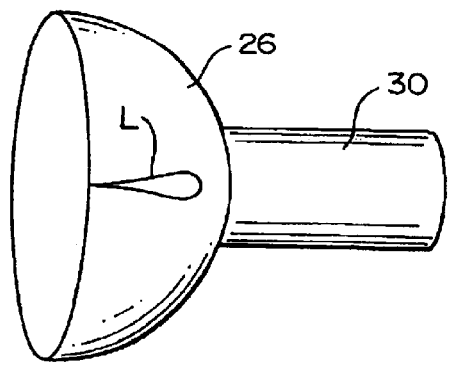
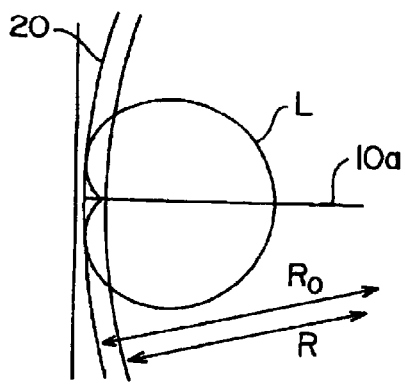
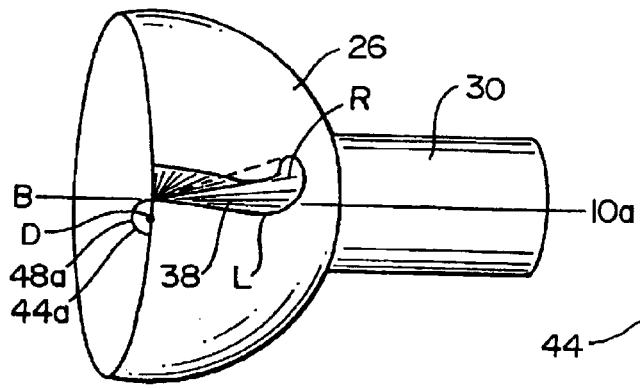
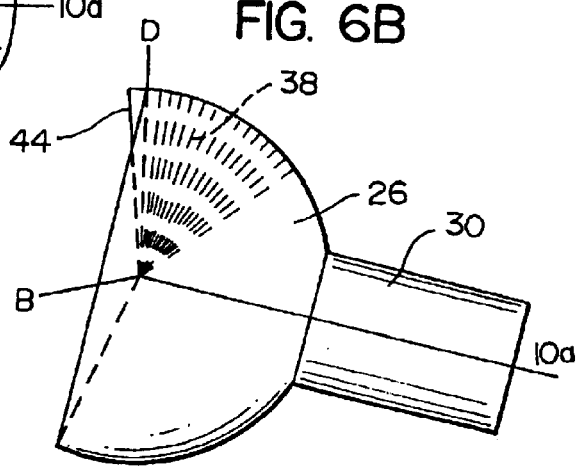
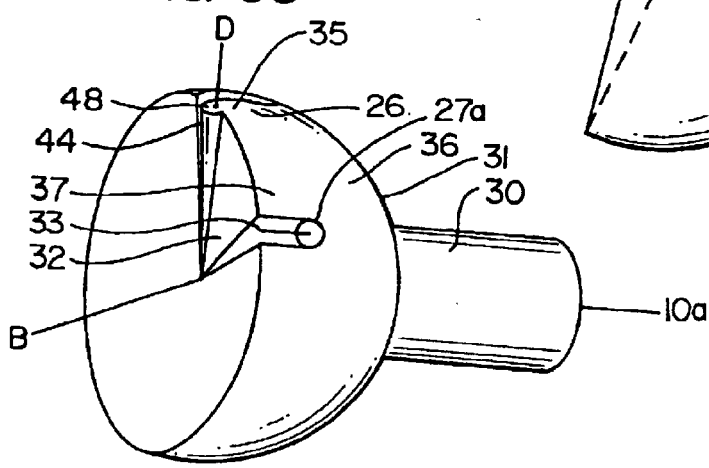

POSITIVE DISPLACEMENT FLOW METER METHOD AND APPARATUS

RELATED APPLICATIONS

This application claims priority of U.S. Provisional Application Ser. No. 60/223,870 filed Aug. 8, 2000 and a continuation of Ser. No. 09/924,374 filed on Aug. 8, 2001 now U.S. Pat. No. 6,705,161.

FIELD OF THE INVENTION

The invention relates to positive displacement machines that convert energy, namely positive displacement devices that displace fluid (incompressible or gas) where the device has continuous rotation to displace fluid contained in operating chambers. The present invention is particularly advantageous for measuring the flow of fluid passing through the operating chambers of the machine.

BACKGROUND

Prior flow meters have limitations of only sampling the volumetric flow or creating excessive head loss of the flow which causes a pressure drop as a fluid passes through the flow meter.

Traditional flow meters either rely on a tight frictional seal between the moving parts which causes greater head loss as the fluid passes therethrough or the moving parts have a loose seal and hence a greater amount of fluid is not accounted for by the positive displacement prior art chambers.

The present invention provides an increase in the amount of accuracy of measured fluid and requires very little pressure differential to rotate the rotor assembly. The present invention flow meter is a low friction, low fluid turbulence, positive displacement device with relatively linear operating characteristics over a wide range of operating speeds and operating fluid viscosities. This linearity will enable accurate and predictable flow metering of a wide range of operating fluids and flow rates with a simple rotational pulse-counter (as is common to the flow meter industry). There are many applications where pulse-counter positive displacement flow meters are used and where a wider flow range, small size, and increased accuracy of a pulse-counter flow meter would offer significant advantages.

Many other applications exist where even higher accuracy would be a significant advantage. Electronic flow meter control systems are common to the flow meter industry. In a second embodiment a control system which works on a unique set of inputs to refine the accuracy of the mechanical components. The control system applied to the rotor assembly has the potential to achieve higher accuracy then is currently available.

The rotors of the present invention and casing will offer excellent repeatability due to low friction and the positive displacement characteristic of the rotors. An obstacle to accurately measure fluid flow is to account for the changing parameters of viscosity, flow and system pressure accurately enough to predict how the rotors will perform under various conditions.

The three main characteristics which will affect the CvR™ flow meter will be fluid viscosity, flow rate, and overall system pressure.

The low flow resistance of the present invention allows higher viscosity fluids to be metered without damage to the flow meter and without causing unacceptable changes in the flow meter operating performance.

The present invention has three distinct advantages which benefit the accuracy and flow range capability of the device. The first characteristic is low mechanical friction. The CvR™ rotors do not contact during operation due to a fluid film between the rotors, and are only limited by the friction of the bearings or bushings. Even with oversized preloaded bearings, the pressure differential required to rotate the flow meter of the present invention rotors has been found to be only 0.5 psi. With low friction bearings, the pressure required to rotate the rotors can be less than 0.05 psi. Low mechanical friction allows the flow meter of the present invention to begin measuring flow with very low pressure differentials providing high accuracy at low flow rates with very little seepage of fluid past the rotors. The lower the pressure differential on either side of the rotors, the less seepage will occur past the rotor seals and because the rotors have so little resistance to rotation, a very low pressure differential will cause the rotors to turn. In other words, the rotors prefer to spin rather then lose fluid (and accuracy) past the seals.

The second characteristic of the flow meter of the present invention which is related closely to the flow rate parameter is low flow resistance that results from the low turbulence characteristic of the rotors that allows very high rotational speeds without excessively high pressure differentials across the rotors. This allows for greater flow rates through a smaller flow meter, and also increases the flow rate range so fewer models need to be produced. In addition to accuracy, increased flow range is very desirable as it will greatly simplify the job of an engineer who needs to account for the performance parameters of each flow meter in their fluid control system.

The third characteristic of the present invention is the lower the inertia of the rotors which results in a lower pressure differential required to cause them to accelerate during sudden changes in flow rate. The rotor assembly has only two moving parts and can be manufactured with a very low moment of inertia.

System pressure affects both the inlet and the discharge sides of the flow meter and therefore has very little effect on the rotors. The primary effect of system pressure is on the casing as it causes it to deform and increase seal gap clearances causing increased seepage and reduced accuracy. The high volume throughput of the flow meter of the present invention allows the use of a smaller volume than with other flow meter devices. This allows easier construction of a less deformable casing structure. In addition, it may be possible to construct the casing so the deformation which occurs with increased pressure actually decreases certain clearances making up for other areas which may increase.

All of the above characteristics are advantages of the flow meter of the present invention which can be further refined with electronic optimization. In a second embodiment the controller uses only three electronic inputs to monitor the changing parameters of fluid viscosity, flow rate, and system pressure and then to compare these values to a stored value database to determine the actual flow rate of fluid through the device at all times. The controller could also be designed to account for the affect of rotor inertia during sudden flow rate changes. Further the controller could account for the effect of temperature on the system with temperature sensors and calibrating the thermal expansion coefficients of the materials of the flow meter of the present invention.

As fluid viscosity of the operating fluid increases, the pressure differential across the flow meter of the present invention will increase due to increased flow resistance and there will be an increased tendency of the fluid to seep past the close tolerance seals. At the same time, however, increased viscosity also decreases the tendency of the fluid to seep past the seals and the two factors have opposing effects upon the flow.

In a preferred form, pressure transducers will be located in a stagnant flow area of the inlet and outlet ports. The viscosity of the fluid being metered will be determined by comparing the speed of the rotors determined with a simple pulse counter with the pressure differential which occurs at this speed. The higher the viscosity of the fluid at a given speed, the higher the pressure differential. A speed to pressure differential graph or function (based on empirical test data) will be stored in the controller and used to determine the viscosity of the fluid (at a predetermined sample rate).

Once the controller has determined the viscosity of the fluid, it will compare this viscosity value to another graph (or mathematical function) which will determine the appropriate flow rate correction at that rotor speed (based on empirical test data with a wide variety of viscosities). The two pressure transducers will also be used to determine the overall system pressure. This value will be compared to another graph (based on empirical test data) which will account for the effect of casing deformation on the flow measurement at that rotor speed and viscosity.

A special "micro-flow" condition will also be accounted for by the controller. This condition will be specified any time a micro-pressure differential is detected across the rotors but the rotors are not spinning. In this case, a very low volume of fluid will be seeping across the rotor seals. Empirical testing data is used to approximate this flow using the last recorded viscosity value for the fluid.

SUMMARY OF THE INVENTION

The invention comprises a machine that converts energy such as a pump to increase the pressure of a fluid, or a motor, turbine, flow meter or actuator taking a pressure differential in a fluid to create rotary motion about a shaft or other device that employs positive displacement of fluid (incompressible or gas). The invention comprises a housing that has an inner surface. A first rotor is mounted for rotation in the housing about a first axis and has a first outer surface that is adapted to intimately engage the inner surface of the housing. There is further a second rotor having a forward portion and a rearward portion and is mounted for rotation and the housing about a second axis that is offset from the first axis and being collinear by an angle α and intersects at a common center of the rotors. The second rotor has a second inner surface that defines at least part of a sphere having a common center with the center of the first rotor. There is a second outer surface that is adapted to engage the inner surface of the housing. The first rotor further has a first contact face that is defined by a locus formed by points on the second rotor as the second rotor rotates about the second axis and the first rotor further has a first contact surface positioned in the forward region of the first rotor.

The second rotor further has a second contact face that is defined by a locus formed by points on the first rotor as the first rotor rotates about the first axis. The second rotor further has a rearward surface that is positioned in the rearward portion of the second rotor. The points of each rotor that define the locus along an outer edge of a common central axis is essentially a radius extending outward from the common centers of the rotor at an angle α/2 from the normal to the axis of the other rotor.

A counter is engaged to at least one of the rotors. The counter is adapted to count the number of rotations of the rotors. The contour surfaces of the first and second rotors define operating chambers that change in volume with respects to rotation of the first and second rotors where a certain amount of fluid passes from the inlet port to the outlet port per revolution of the first and second rotors and the counter indicates the number of rotations.

BRIEF DESCRIPTION OF THE DRAWINGS

FIG. 3A is a top view of the master rotor of FIG. 2A with a vertically oriented cone of material conceptually overlaid on the front face of the master rotor, the cone having its apex at the intersection of axis A and axis B (same as the center of the master rotor sphere);

FIGS. 3B and 3C are a side view and isometric view respectively of the master rotor of FIG. 3A;

FIG. 4A is a top view of the master rotor of FIG. 3A showing the movement of the conceptual cone in the frame of reference of the master rotor as would be traced by the conceptual cone if it were attached to the front face of an essentially identical rotor (slave rotor) lying on axis B and having a center at the point of intersection of axis A and axis B and if the slave rotor was rotated through 180° with the master rotor from the vertical position (the conceptual cone is shown starting off center but it should be appreciated that the axis of the cone begins its movement at top dead center, corresponding to the point of lowest compression in the engine of this invention);

FIGS. 4B and 4C are a side view and isometric view respectively of the master rotor of FIG. 4A;

FIG. 5A shows the trace of the center of the conceptual cone of FIG. 3A on the surface of the master rotor while the slave rotor and master rotor make one revolution about their respective axes;

FIG. 5B shows the trace of FIG. 5A seen in the A axis direction;

FIG. 6A is a top view of the master rotor of FIG. 4A showing an actual cone of material added to the front face of the master rotor, the cone having its apex at the intersection of axis A and axis B, with the axis of the cone lying along the face of the master rotor whose surface is tangential to a contact face of the master rotor;

FIG. 6B is a side view of the master rotor of FIG. 6A;

FIG. 6C is an isometric view respectively of the master rotor where a second conceptual cone traces the base teardrop line as the cone and master rotors rotate about the B and A axis respectively to define an opposing engagement face;

FIG. 8B shows an array of the reference axis about the B axis;

DETAILED DESCRIPTION OF THE PREFERRED EMBODIMENT

Throughout this description reference is made to top and bottom, front and rear. The device of the present invention can, and will in practice, be in numerous positions and orientations. These orientation terms, such as top and bottom, are obviously used for aiding the description and are not meant to limit the invention to any specific orientation.

Points on a line bisecting the larger angle formed between offset intersecting axes A and B in the plane defined by axes A and B will be referred to as being at the "top", while points on the extension of that line bisecting the acute angle between axes A and B will be referred to as being at the "bottom".

Figure 11:
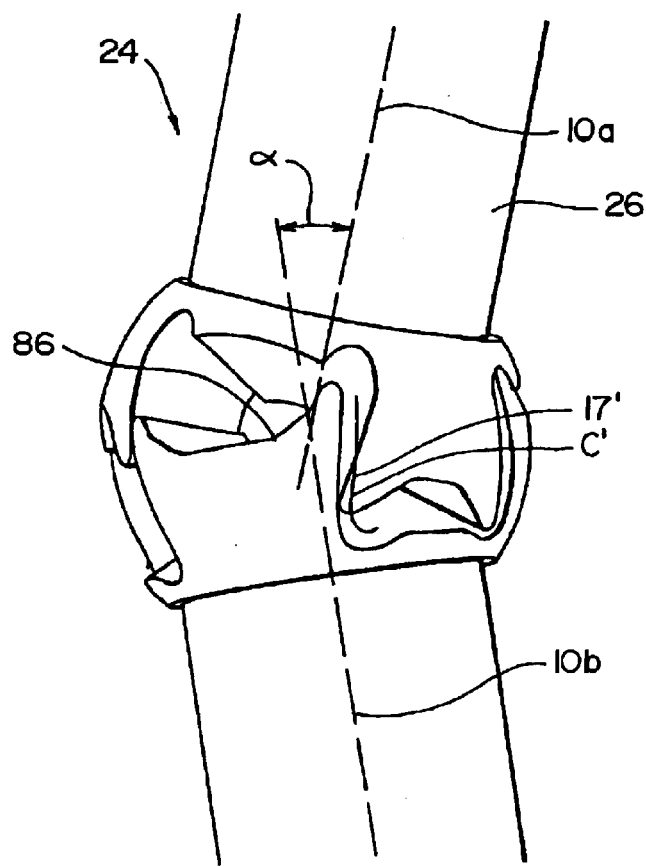
FIG. 11 is a side view of the rotor assembly showing the axis of each rotor.

To ease explanation, two axis systems are defined, one for a first rotor and a second axis system for a second rotor where the angle between the axis is defined as α (see FIG. 11). The axis 10a is referred to as the longitudinal or axial axis and is defined as the center of rotation of shaft for the rotor 122. Likewise, the axis 10b is referred to as the longitudinal or axial axis and is defined as the center of rotation for shaft of the rotor 124. The axis indicated at 12a is referred to as the radially lateral axis for the first rotor and axis 12b is referred to as the radially lateral axis for the second rotor. Further, the arrow 14a is the radially transverse axis pointing in a forward direction and the arrow 14b is a radially transverse axis indicating a forward direction. The origin of the axis systems is most commonly (and by default) at the common center of the rotors.

The foundational description of the formation of the rotors is discussed below with reference to FIGS. 1–8 followed by a description of the balanced rotor design. Then there is a discussion of the first embodiment of a flow meter. Finally there is a discussion regarding a second embodiment of the flow meter.

Figure 1:
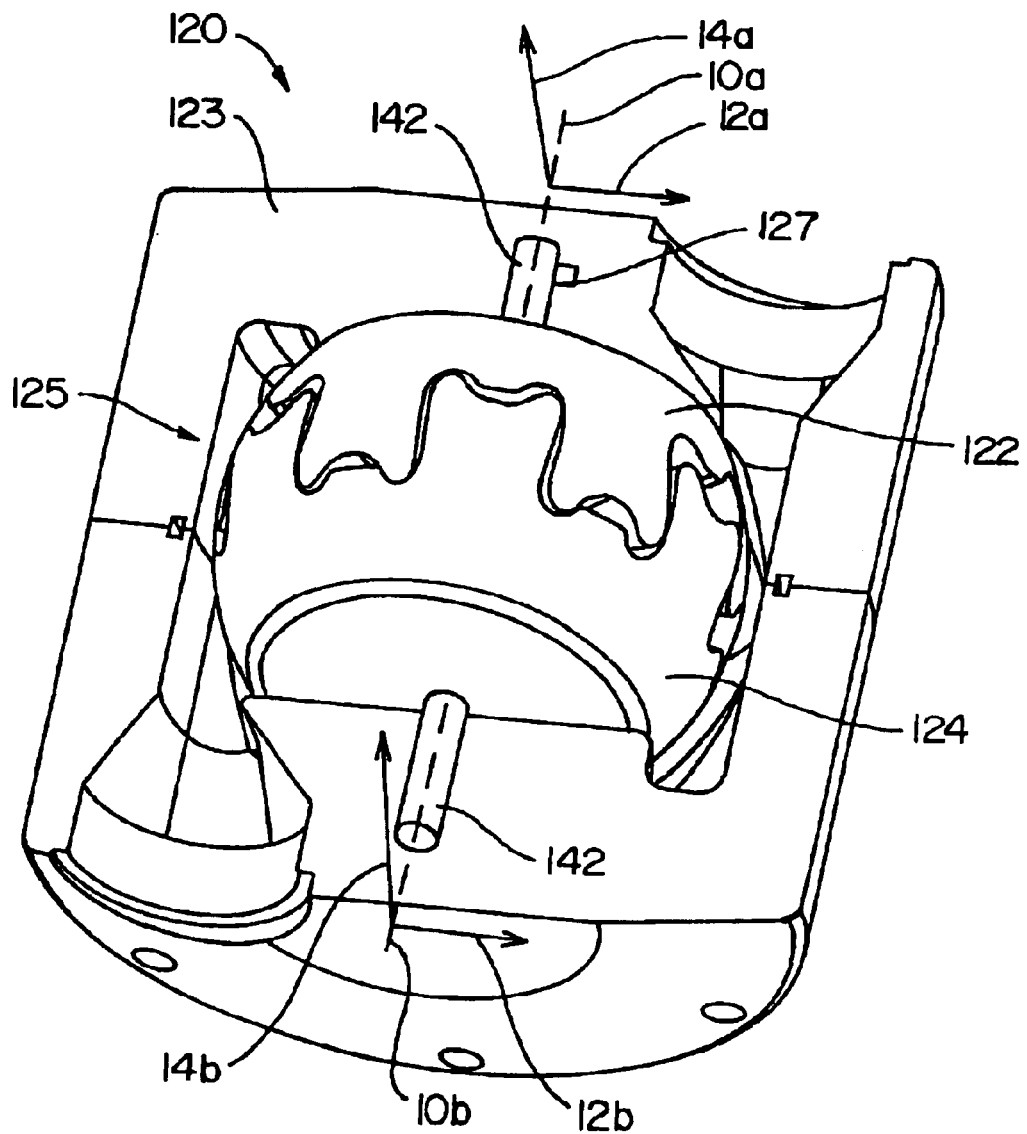
FIG. 1 is a partial cross-sectional view of the flow meter assembly.

In general the flow meter 120 as shown in FIG. 1 comprises a casing 123, a rotor assembly 125, and a counter 127.

Figure 1A:
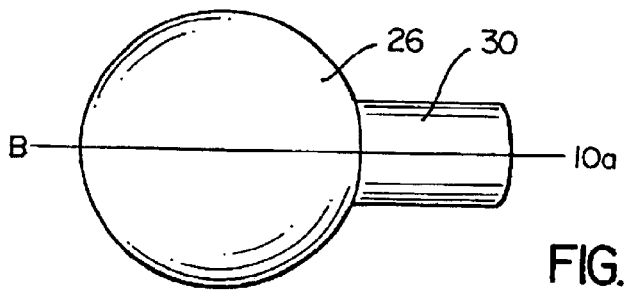
FIG. 1A is a top view of a spherical master rotor on axial shaft lying on axis A at an angle α to axis B prior to modification of the rotor in accordance with the principles of the invention.
Figure 1B:
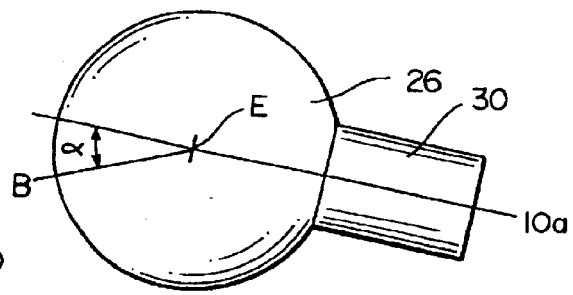
FIGS. 1B and 1C are a side view and isometric view respectively of the master rotor of FIG. 1A.
Figure 1C:
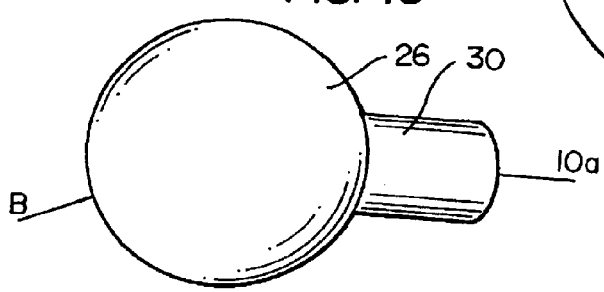
Figure 8A:
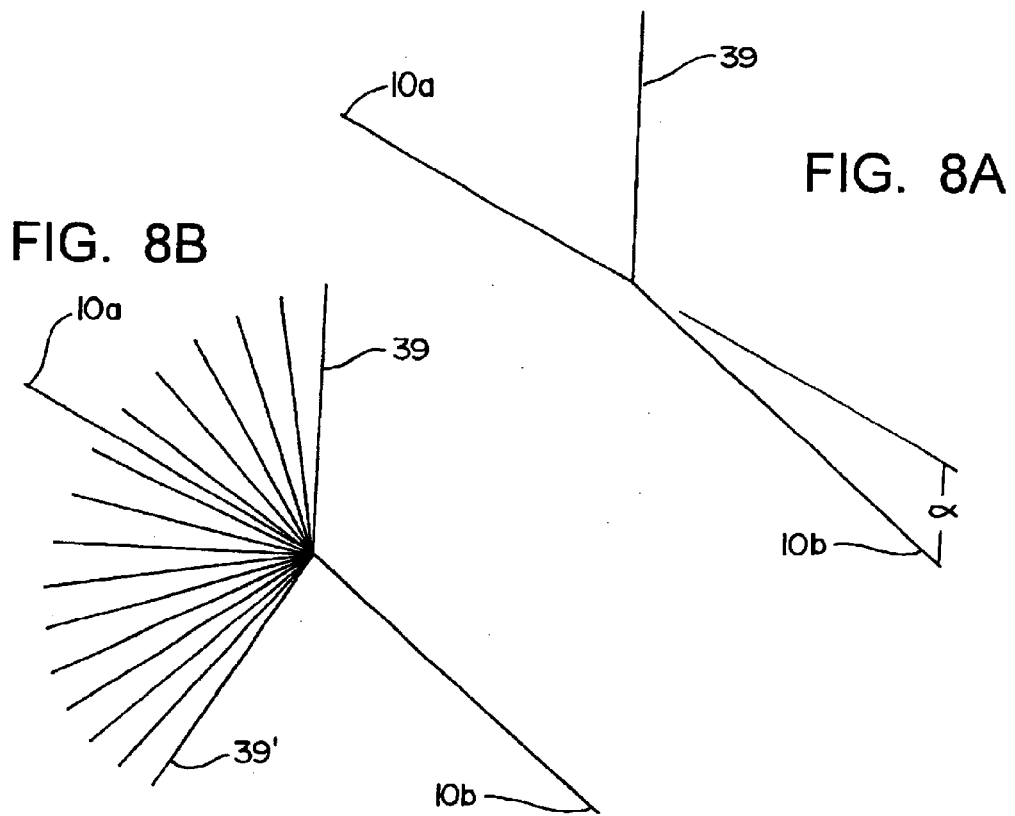
FIG. 8A is a computer-aided drawing showing the axis A and axis B offset from being collinear and intersecting at a common intersect point with a reference axis bisecting the two axis on the obtuse angle portion of the axes.
Figure 8C:
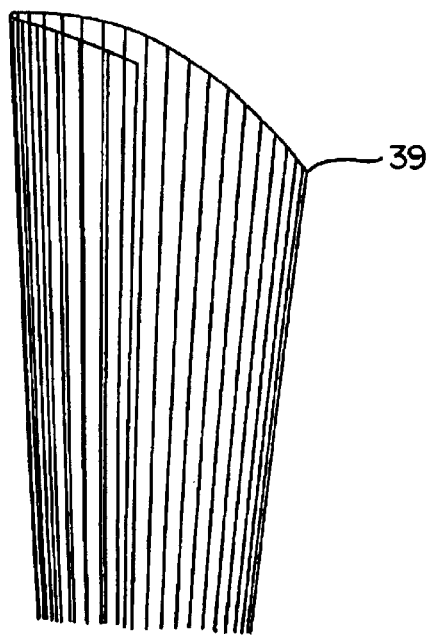
FIG. 8C shows the array of reference axis rotated about the axes A to construct the base reference line.
Figure 8D:
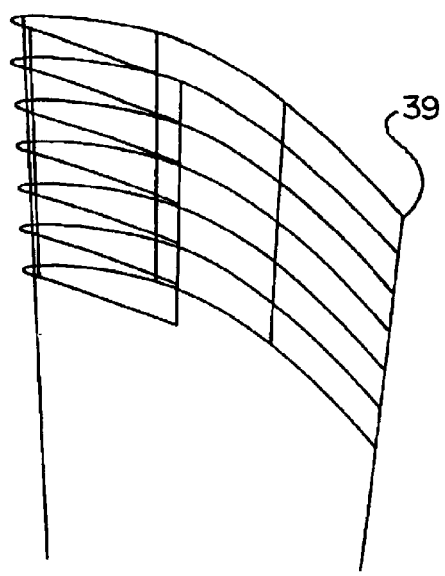
FIG. 8D shows a base reference line offset toward the origin.
Figure 8E:
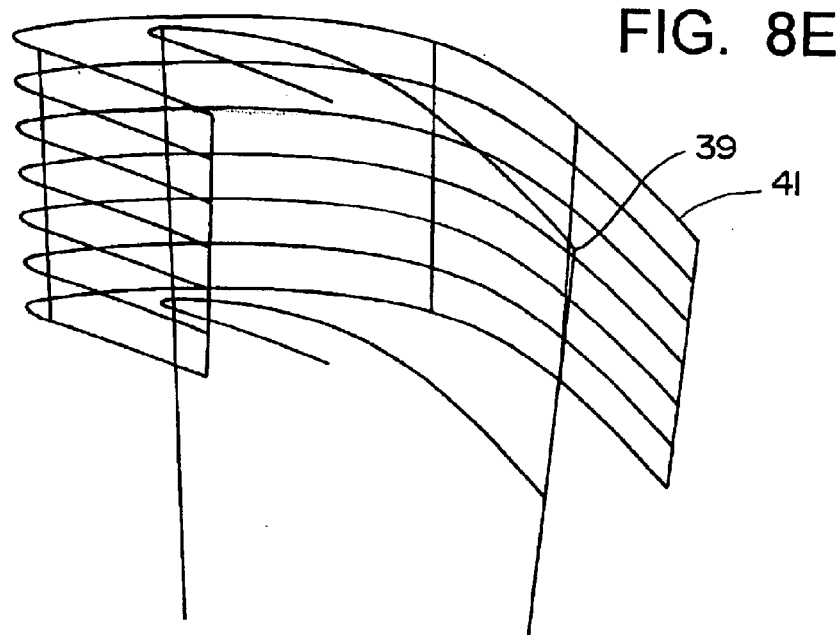
FIG. 8E shows an offset ideal surface from the base reference surface.
Figure 8F:
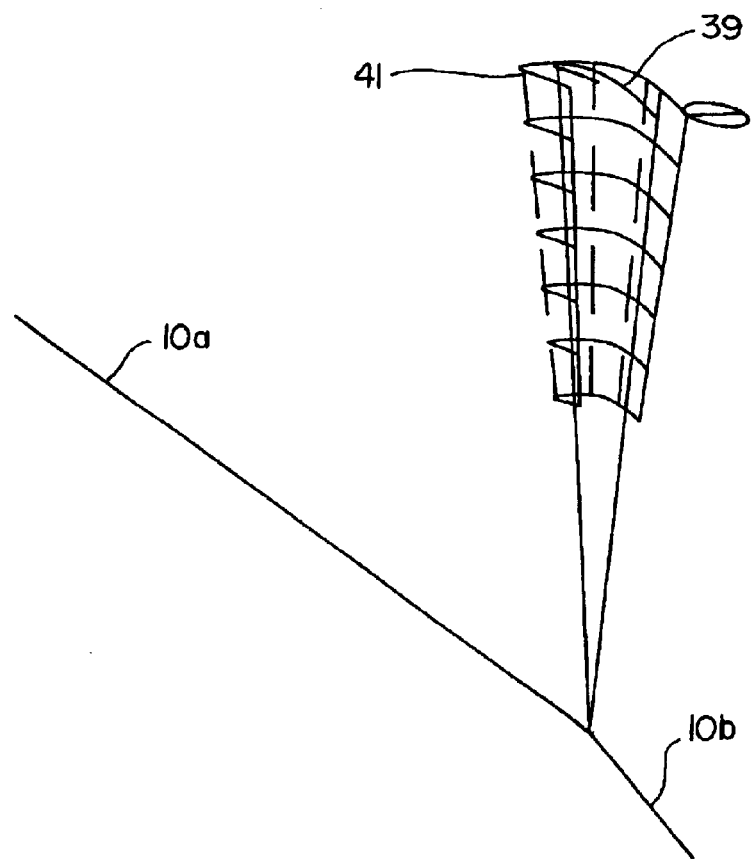
FIG. 8F shows a an engagement tip cone attached to the forward region of the ideal reference surface.
Figure 9:
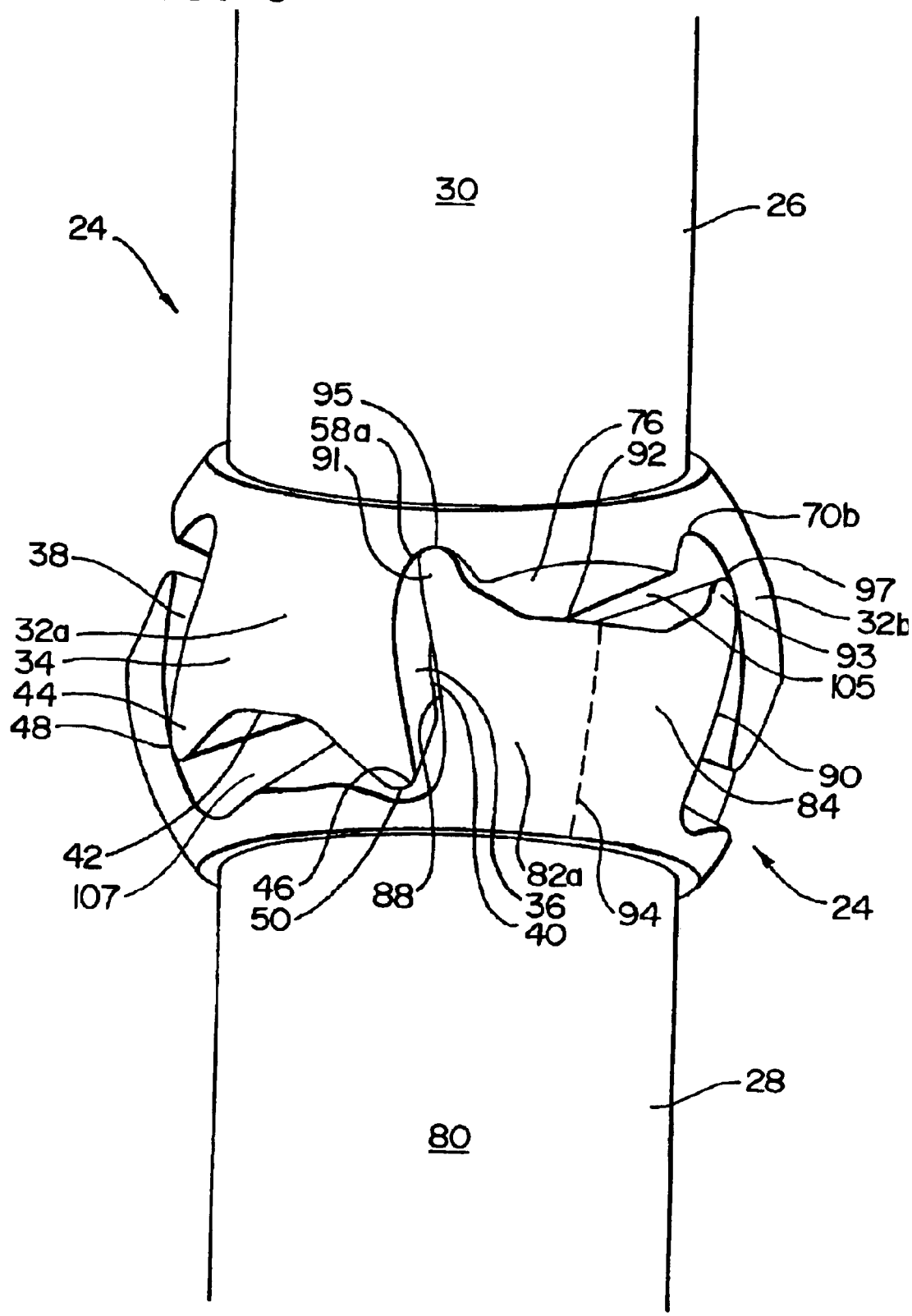
FIG. 9 is a front view of the rotor assembly at the bottom dead center position.
Figure 10A:
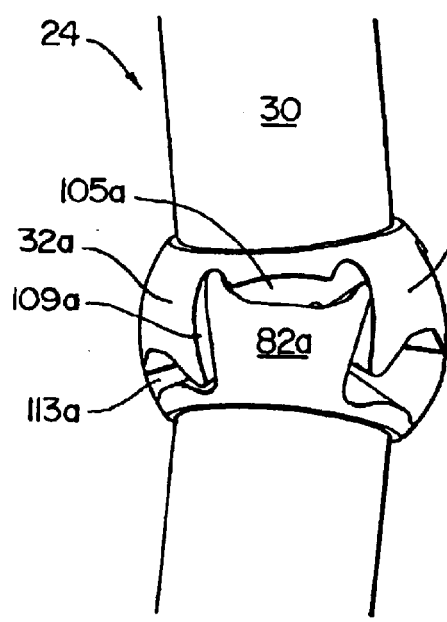
FIGS. 10A–10B show views of the rotor assembly in one position but taken from isometric perspectives in approximately twenty degree increments at the bottom dead center position.
Figure 10B:
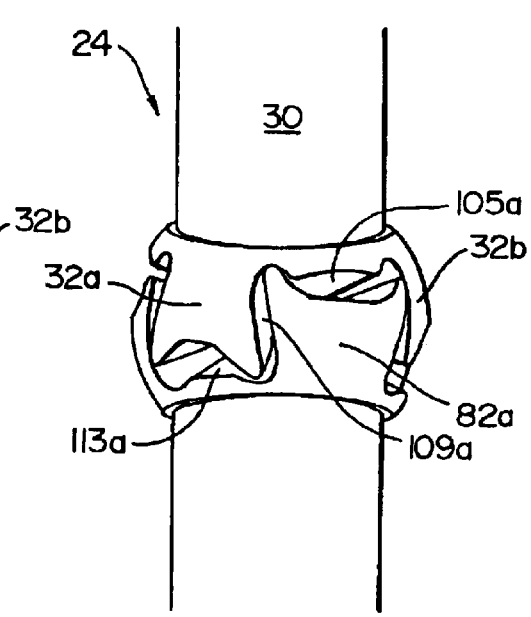

The construction of the rotor assembly 125 is described referring to FIGS. 1–8. As shown in FIGS. 1A, 1B and 1C, where a rotor 26 is shown, for example, in an initial stage of construction. The slave rotor 28 of FIG. 9 is constructed in a similar manner. The master rotor 26 begins as a sphere with a shaft 30 lying along an axis A. Axis B is shown at an angle α to the axis A.

Figure 2A:
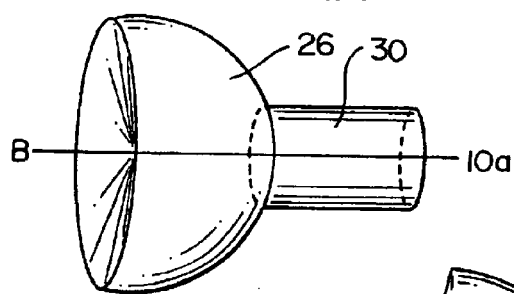
FIG. 2A is a top view of a master rotor having material removed from the side of the rotor opposed to the axial shaft leaving a conical face with the apex of the cone at the center of the sphere with its axis aligned with the axis A.
Figure 2B:
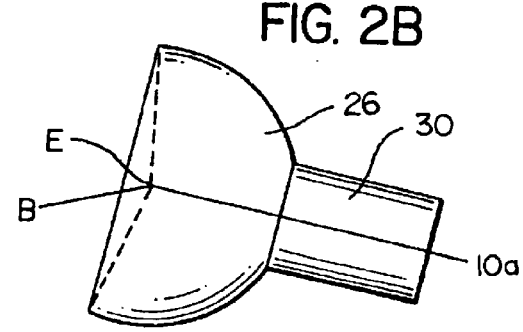
FIGS. 2B and 2C are a side view and isometric view respectively of the master rotor of FIG. 2A.
Figure 2C:
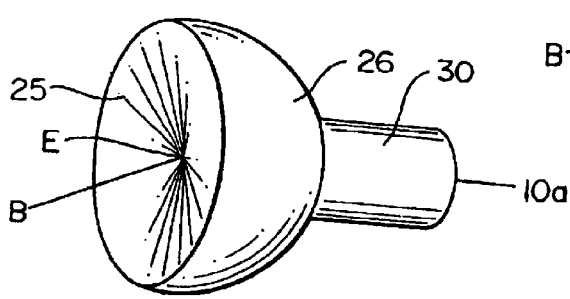

Referring to FIGS. 2A, 2B and 2C, material is removed from the master rotor 26 to leave a conical funnel section 25 whose apex is at the center E of the spherical master rotor 26, and whose apical angle is 180°−α. The axis of the funnel section 25 lies along the axis 10a.

Figure 4D:
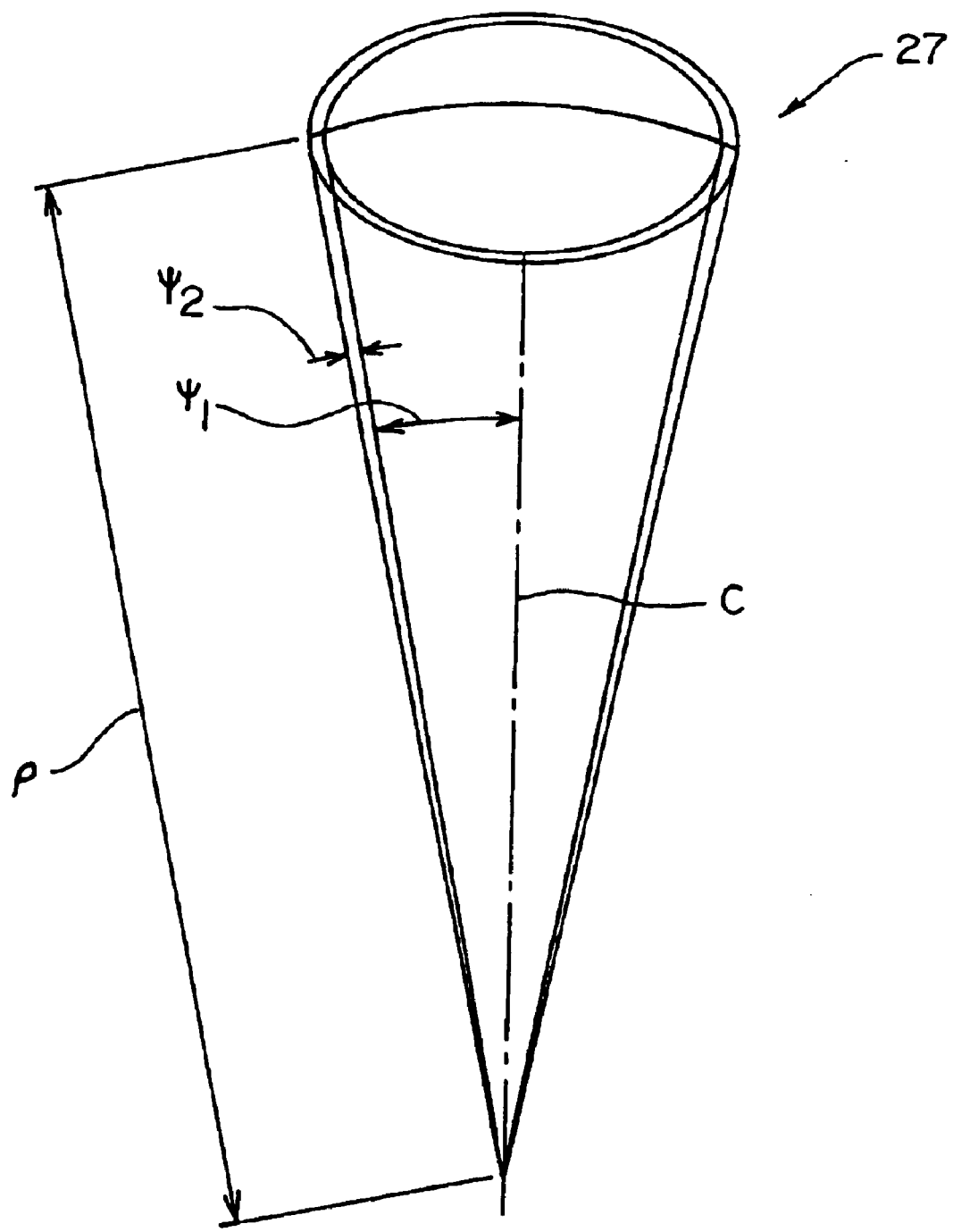
FIG. 4D is an isometric view of the cutting, where the column has a final apical angle ψ that is a sum of ψ1 and ψ2 wear ψ1 is radius of the adjacent engagement tip of the opposing rotor and the value of ψ2 is the fluid film thickness gap and between the adjacent engagement tip and the engagement face being constructed by the conceptual cone.

Referring to FIGS. 3A, 3B and 3C, a conceptual cone 27 is overlaid on the master rotor 26. This conceptual cone 27 may be thought of as part of the slave rotor 28 plus a desired gap clearance, as if the conceptual cone 27 were lying on the equivalent part of the slave rotor 28 when the slave rotor 28 has its center located at the center of the master rotor 26 (both at center E of the spherical housing). As shown in FIG. 9, the conceptual cone 27 is the tip 93 of one of the lobes 84 of the slave rotor 28 minus the desired fluid film gap radial distance. In one form, the cone 27 has its apex at the center of the sphere of the master rotor 26, and its central axis C lies along the surface of the conical face of the master rotor 20, such that the central axis C is a radius extending outward from the center of the cavity at an angle α/2 from a normal to the axis of the other rotor. In effect, the central axis C of the cone bisects the larger of the two angles formed by the axis A and the axis B in the plane in which both axes 10a and 10b lie. As shown in FIG. 4D, the cone 27 has an apical angle ψ. The value of ψ depends partially on the strength of the material of which the master rotor 26 and slave rotor 28 are made. The greater the angle ψ, the lower the stresses on the tips of the vanes 35 and 37 that comprise the lobes 32 and 82, and the lower the pressure exerted by the lobes 32 and 82 on the engagement 36, 38, 88 and 90 (see FIG. 9). Large values of a near 45° requires smaller values of ψ to avoid the vanes extending past the axis of rotation and to avoid removal of too much material, the material being needed to support the vanes. Smaller values of α may have larger values of ψ for like reason where α is between 0+° and 45°.

Referring back to FIG. 4D, the apical angle ψ of the conceptual cutting cone 27 is equal to the apical angle ψ1 of the adjacent engagement tip of the opposing rotor that engages the face to be cut by the cone 44 plus the required apical angle ψ2 to create a desirable fluid film gap. The additional angle to create a fluid film gap can actually be a negative value whereby the cutting cone has a smaller apical angle than the adjacent engagement tip to create an interference fit. This is desirable when the rotors are made from materials that have a lower modulus elasticity and an interference seal is desired where the lobes of opposing rotors are forcefully engaging one another.

Figure 16:
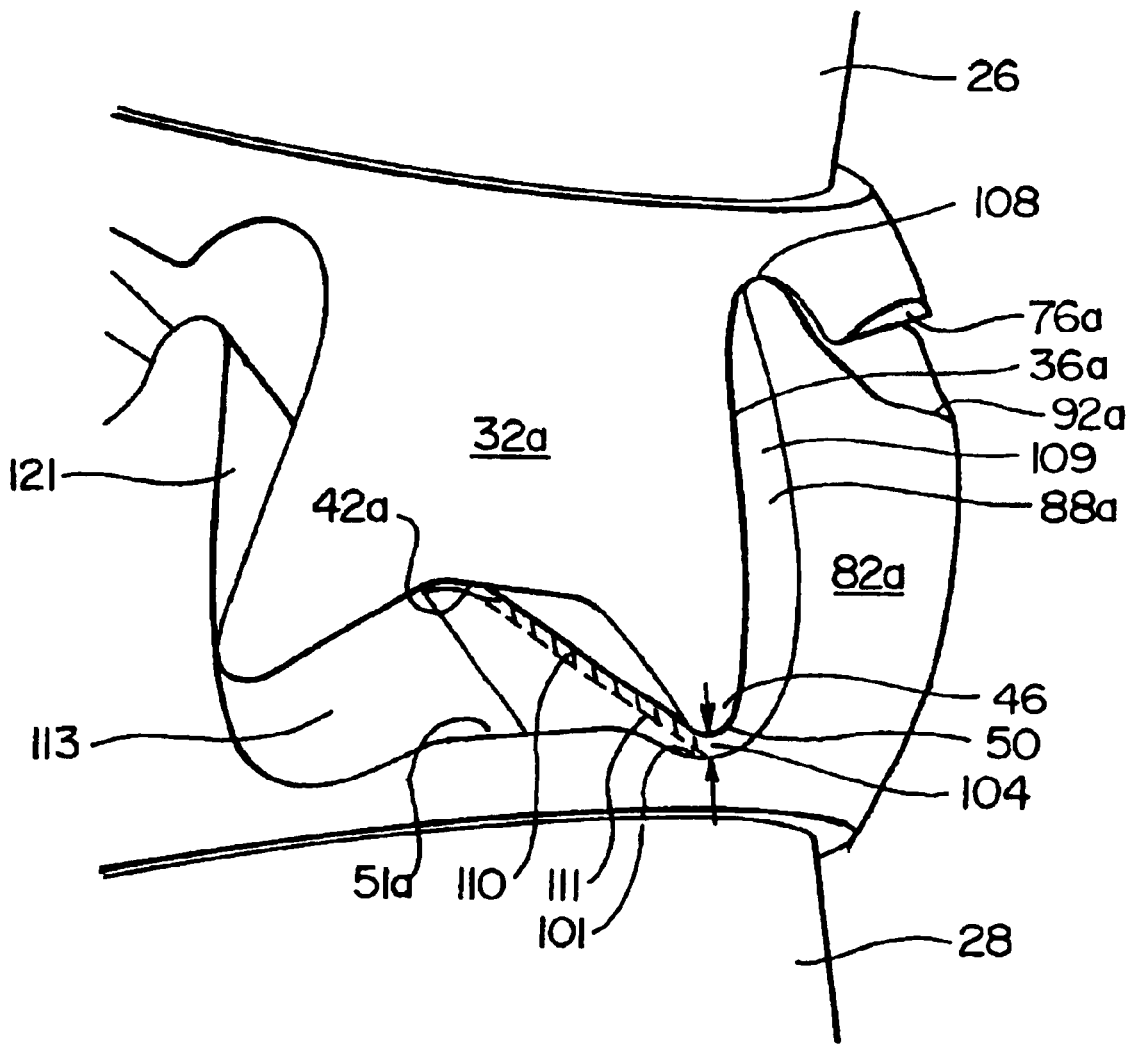
FIG. 16 shows the gap which is present between the master and slave rotors at the bottom dead center position to allow a pressure difference be distributed therethrough.

As shown in FIG. 9, the tip 91 of the opposing rotor that engages the contour face 36 is referred to as the adjacent engagement tip with respects to the face. An adjacent tip with a corresponding contour face are collectively referred to as a "tip-face combination". As shown in FIG. 16, two adjacent opposing rotor contour faces such as the first surfaces 36a and 88a for the first and second rotors 26 and 28 are collectively referred to as "adjacent contour faces of opposite rotors". Further, the rearward and forward surfaces such as surface 51a of the second rotor 28 and the forward surface 42a are collectively referred to as a "slave rearward surface—power forward surface combination". In a similar manner, the combination of opposing rotor surfaces for the slave forward surfaces and the power rearward surfaces such as 76a and 92a are collectively referred to as a "slave forward surface—power rearward surface combination".

The value of ψ2 can change with respects to ρ (the distance from the common center of the rotors) to create a variable fluid film gap with respects to ρ. For example, the angle ψ2 can increase with respect to ρ to create a consistent fluid film gap from the radial outward portion of the contact face to the radially inward portion of the contact face. Likewise, the value of ψ1 can change with respects to ρ because the points of engagement between points on a tip face combination of the opposing rotors is a constant distance from the common center of the rotors. In other words, as shown in FIGS. 3C and 4A, the circular region 29 of the cone 27 is at a distance from the common center of the rotors. The center of the circular region 29 defines a teardrop shaped engagement line 19 that is a constant distance from the common centerpoint E. Therefore, at any given distance $\rho_i$ from the centerpoint, the cutting cone can have a variable radius from the central axis C of the cone. Thus, the cone can have a variety of shapes such as a straight cylinder or even an inverted cone.

Referring to FIGS. 4A, 4B and 4C, to create a contour face (or surface) 38, the conceptual cone 27 is rotated with the master rotor 26 as if the cone were on the slave rotor 28 lying on axis B with its center at the center of the master rotor 26. The path of the cone 27 is shown in FIG. 4A where the travel of the center axis C is defined as the base reference line or teardrop surface 19. The locus L of the center of the cone at the surface of the rotor 26 in the frame of reference of the master rotor 26 is shown in FIGS. 5A and 5B. FIG. 5A shows a top view. FIG. 5B shows a view along the axis A where it will be seen that the locus L is a tear drop shape. The actual shape 38a removed by the cone 27 is defined approximately by adding a band ψ/2 wide around the tear drop shape shown in FIG. 4A. The tear drop is on the surface of a sphere so that angular distances are readily calculated. A mathematical description of the locus L is as follows.

If ρ is the radius of the sphere defining the master rotor 20, and θ is the rotational angle from the top, and α is the angle between the axes 10a and 10b then the trace of a point (x,y,z) on the axis 10b in the frame of reference of the master rotor 20 for the base reference tear drop 17 has been found to be:

$$X\_base = \rho\left(\cos(\theta)^2\cos\left(\frac{1}{2}\alpha\right)\cos(\alpha) + \right.$$
$$\left.\cos(\theta)\sin\left(\frac{1}{2}\alpha\right)\sin(\alpha) + \cos\left(\frac{1}{2}\alpha\right) - \cos\left(\frac{1}{2}\alpha\right)\cos(\theta)^2\right)$$

$$Y\_base = -\rho\sin(\theta)\left(\cos(\theta)\cos\left(\frac{1}{2}\alpha\right)\cos(\alpha) + \right.$$
$$\left.\sin\left(\frac{1}{2}\alpha\right)\sin(\alpha) - \cos\left(\frac{1}{2}\alpha\right)\cos(\theta)\right)$$

$$Z\_base = \rho\left(\cos(\theta)\cos\left(\frac{1}{2}\alpha\right)\sin(\alpha) - \sin\left(\frac{1}{2}\alpha\right)\cos(\alpha)\right)$$

Rotation of the rotors about 180°–220° around the axes A and B, with consequential movement of the cone 27 within the master rotor 26 is required to create the entire engagement face 36. Rotation less than 180° by a small amount may be acceptable in some cases, although not preferred. Such a design may allow some fluid flow between the lobes at the bottom point of the rotation. This may avoid vibration due to rapid pressure changes in the chamber between the two contact faces at the bottom of the rotation. At this position, the contact faces lie adjacent to one another. If one contact face is constructed by rotation less than 180°, then the corresponding contact face on the other rotor could be constructed by rotation greater than 180°.

The cone could be rotated 360° during construction but as the surface so created prevents use of interlocking vanes, requiring subsequent removal of material from the master rotor 26, there is no need to do so. The contact faces 36, 38, 88 and 90 of each rotor 26, 28 are defined in this manner. There may be any number of contact faces on each rotor on any number of lobes that can be fit upon.

Effectively, this manner of construction means that each contact face of one rotor 26, 28 is defined by the locus formed as the rotors 26, 28 rotate about their respective axes A, B by points on the other rotor lying along an outer edge of the cone.

Figure 7A:
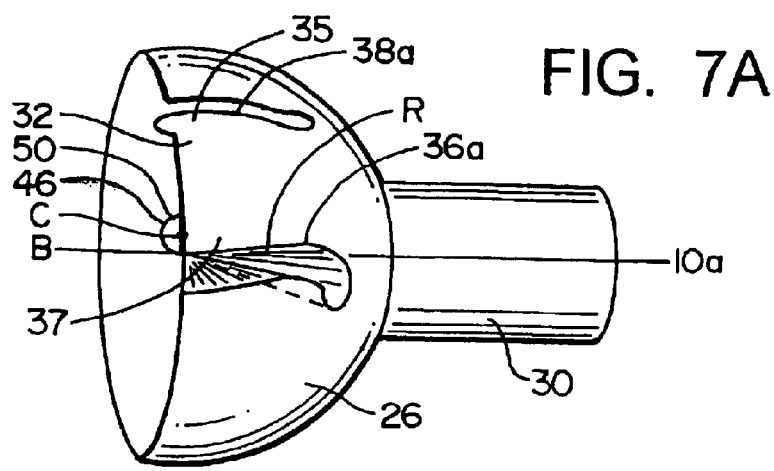
FIG. 7A is an isometric view of the second engagement surface with the engagement tip attached to the forward region of the engagement surface.
Figure 7B:
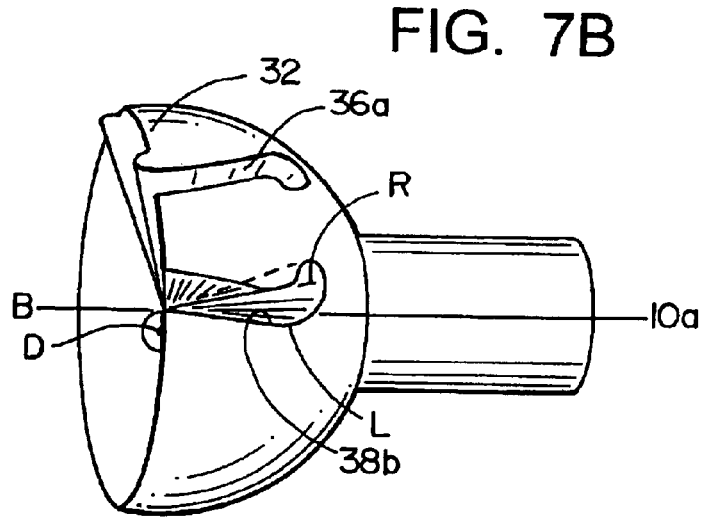
FIG. 7B is an isometric view showing a third engagement face similar to the first engagement face.
Figure 7C:
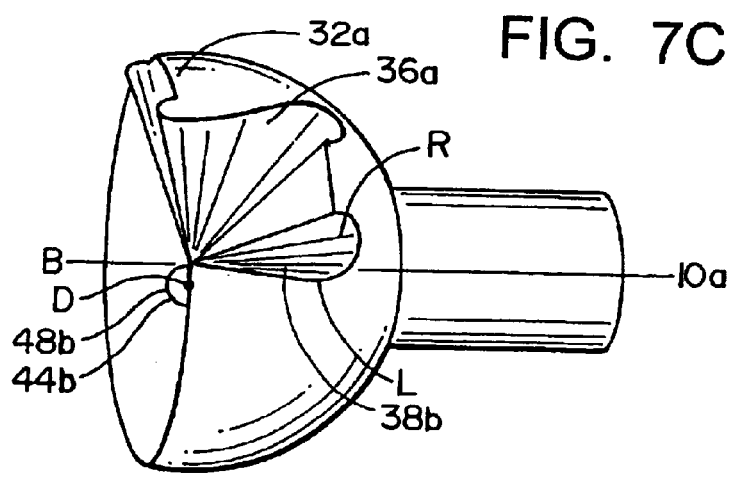
FIG. 7C is an isometric view of the second and third engagement faces with the material interposed therebetween removed.

Since the contour faces 36, 38, 88 and 90 (see FIG. 9) of each rotor are defined by the movement of points on the other rotor as the two rotors rotate with each other, it can be guaranteed that there will be points of contact between the two rotors along a radially extending line R lying along a contact face through at least 180° of motion (see FIGS. 7A–7C). The lines R shading the contact face 36, 38, 88 and 90 in FIGS. 4A, 4B, 4C, 6A, 6B, 6C, 7A, 7B and 7C illustrate the radial lines which define the instantaneous points of contact as the rotors rotate relative to each other. As the line defining the points of contact between the rotors reaches its furthest penetration into the rotor, continuation of contact on that contact face will mean that the contact face will wrap back on itself as shown in FIG. 5A. This would allow no part of the slave rotor 28 to penetrate the tear drop shape, unless the opposed faces of the tear drop cavity swept out by the conceptual cone maintained a sufficient separation to allow penetration by a vane of the slave rotor. Therefore, in the case where the vanes are to be symmetrical, it is necessary for the point of contact between the rotors to switch to a corresponding contact face on the other rotor. It so happens that when each rotor is a mirror image of the other, and contact faces are defined as illustrated in FIGS. 4A, 4B and 4C, then the line of contact switches from the contact face 36 of one rotor to a contact face of the other rotor. This switch occurs at the bottom of the housing and at the top of the housing, namely when the contact faces straddle the line bisecting the acute angle between the axes A and B. As described further herein the base region of the slave rotor 28 will not engage the tip 46 of the master rotor to provide access to a secondary chamber at bottom dead center (BDC). By construction of all contact faces 36, 38, 88 and 90 in the manner described, engagement between vanes the engagement tips and the contour faces of opposed rotors may be guaranteed for at least one set of tip-face combinations. Use of a cone for shaping one rotor, thereby removing material, however, will leave a gap between the rotors unless material is added to the other rotor.

FIGS. 6A, 6B and 6C, show how gaps between the rotors at the vane contacts are avoided. A cone of material 44 corresponding exactly to the portion of the conceptual cone 27 having an apical radius of $\psi 1$ (psi1) as shown in FIG. 4D is added to the rotor. It should be noted that the values of $\psi 1$ and $\psi 2$ can be functions with respect to $\rho$ (the radial distance from center E) and $\alpha$ (the amount of rotation about the axes 10a and 10b) to produce a variable tip radius from the center axis of the cone and a variable gap clearance with respects to row and the amount of rotation of the rotors. In these figures, the cone of material 27 is shown on the master rotor 26. Rotation of this cone of material in addition to the value of $\psi 2$ to define the gap clearance on the master rotor 26 while the slave rotor 28 rotates with the master rotor will create a contour face 90 (FIG. 9) on the slave rotor 28 in the same manner as the contour face 36 was created on the master rotor 26. The contour faces 88 and 90 will have the same tear drop shape as shown in FIGS. 5A and 5B. In order for the correct tear drop shape to be made, the starting point for the removal of material from the rotor must be when the axis D of the cone of material 27 lies at the top, namely along the line bisecting the obtuse angle between the axes A and B. Thus, as shown in FIG. 6A, the cone 27 must be rotated by half of its apical angle before it can be used to remove material from the slave rotor 28. The $\psi 1$ inner apical angle of the cone 27 defines the tip 44 of a vane that is part of the lobe 32 on the master rotor 26. The extra amount of material on the tip 28 created by the cone of material 48 compensates for the loss of material during construction of the master rotors contoured faces by using the conceptual cone 44. It will be noted that the cones 27 and 44 need not be exactly conical, nor must the apex of the cone be exactly at the center of the cavity, but contact portions between the vanes comprising lobes 32 of the master rotor 26 and contact faces 88 and 90 on the slave rotor 28 should have a smooth surface. The closer the apex to the center of the cavity, the smaller the clearance gap between the contact tips and engagement faces during the operation of the rotors. The term essentially as used in the claims is intended to cover an engine whose cone 27 is not exactly defined in the manner stated, but that embodies the concept of the invention.

As shown in FIG. 6C a second conceptual cone 27a is used to define a second contact surface 36 in a similar manner as above, the center axis D' of the cone 29 travels along the teardrop shape path 31. Consistent with the foregoing, the teardrop surface 31 is formed by positioning the forward portion 33 of the teardrop at the top dead center location and simultaneously rotating the power rotor 26 about the A axis and the reference axis D about the B axis while having the reference axis D maintain a constant angle of $\alpha/2$ from the B axis. The major difference between the teardrop surface 31 and the teardrop surface 17 as shown in FIG. 4A is the direction of rotation of both the A and B axes. In a similar fashion as described above, the portion of the cone 31 having the inner apical radius $\psi 1$ is positioned in a manner as shown in FIG. 7A. It should be noted that to create the base teardrop line 31 the rotors are rotated in the opposite direction a value of about 180–220 as to the direction to create the base teardrop line 17 of FIG. 4A. The second engagement surface 36 is a part of a second vane 37 where the first and second vanes 35 and 37 comprise a lobe 32. In the preferred form, the material between the engagement surfaces 34 and 34 remains interposed therein between for strength and rigidity of the lobe 32.

A third engagement face 38b is created as shown in FIG. 7B. This engagement face is similar to that as shown in FIG. 6A except for the rotational location of the engagement face 38b. To put the construction of the rotor configuration in perspective, reference is made to FIG. 11 showing a completed rotor set 24 where the base teardrop surface 17' is shown in and the center of the cone C' runs along the base teardrop surface 17' during rotation of the rotors.

The next step is removal of the material interposed between the second and third engagement faces 36a and 38b in a manner as shown in FIG. 7C. This void allows for the lobe 82a of the slave rotor to be positioned therein during operation of the engine 20 (see FIG. 9). The final step after the lobes are created is to manipulate the rearward surfaces 76 and the forward surfaces 42 to create desirable compression ratios and ensure that the forward and base surfaces of the opposing rotors do not crash into one another at BDC.

A variety of mathematical, CAD, and CNC programs can be employed to construct the aforementioned surfaces. A desirable method of making the base curve surface and the ideal curve surface can be executed to a computer-aided design program with reference to FIGS. 8A–8E. As shown in FIG. 8A, two axis are constructed and are offset from being collinear at angle $\alpha$ (alpha). A base reference line (bifurcating line) 39 is constructed which bisects the A 10a axis and B 10b axis. To construct the base teardrop curve for the A axis rotor, the base axis is arrayed about the A axis 10a a desirable number of increments as shown in FIG. 8B. Thereafter, the user coordinate system is set with reference to the A axis 10a and each arrayed line is rotated about the A axis 10a an equal amount of degrees as it was rotated about the B axis 10b. For example, the reference axis 39' is rotated approximately 160 degrees about the B axis. Therefore, the reference axis 39' is rotated 160 degrees back around the A axis to the position as shown in FIG. 8C. Thereafter, computer-aided drawing tools such as spline, scaling, and offset can be employed to create the base reference curve as shown in FIG. 8D. In particular, the end points of the axis as shown in FIG. 8C can be selected using a spline tool whereby making a continuous line along these points. Thereafter, this spline can be scaled towards the origin (the common center of the rotors) and a base surface is created using the original base reference line and the scaled reference line as shown in FIG. 8E. This surface can be offset using a computer-aided drawing offset tool where the amount of offset is similar to that as the apical radius $\psi$ of the conceptual cone 27 discussed above. Finally, a contact tip can be attached to the forward portion of the offset line 41 where the radius of the cone tip is equal to $\psi1$, the amount of offset between the base surface and the ideal surface minus the amount of fluid gap clearance that is desired (see FIG. 8F).

The ideal surface can be exported to a solid modeling program for constructing the forward and base surfaces and arraying and mirroring the ideal surface 41 to construct the desired number of lobes for the rotor.

With the foregoing in mind, there will now be a detailed discussion of the various aspects and components of the rotors with reference to FIGS. 9–16 with particular attention being directed towards removal of material at the base region of the slave rotor to allow a rotationally balanced design.

As seen in FIG. 9, the rotor assembly 24 comprises a master rotor 26 and a slave rotor 28. The master rotor comprises a shaft 30 and a plurality of lobes 32a, b, and c (all of which are generally referred to herein as numeral 32). For ease of discussion, the lobe 32a will be described in detail with the understanding the specification applies to all of the lobes on the power rotor. Likewise, additional lobes could be employed without departing from the basic geometry that create sealed chambers and balanced radial forces (further discussed herein).

The lobes 32 have a radial outer surface 34, a first surface and second surface 36 and 38 (described above), a spherical inner surface 40, and a forward surface 42. The lobes 32 further have tips 44 and these tips each have a contact surface 48 and 50. The surfaces 36, 38, 48 and 50 are described further herein.

The forward portion of surface 34 defines at least part of a sphere and is adapted to engage the inner surface of the housing 22 (see FIG. 1). The spherical inner surface 40 also defines a portion of a sphere and is intimately engaged in a center bearing 23 or is a unitary piece with a center bearing 23 as shown in a second embodiment below. In the broader scope the surfaces can converge to the centerpoint of the rotors whereby removing the need of the center bearing 23.

The surfaces 36 and 38 (as well as the forward portions of surfaces 88 and 90) are described above and thoroughly in U.S. Pat. Nos. 6,036,463 and 5,755,196 which are hereby fully incorporated by reference.

Figure 12:
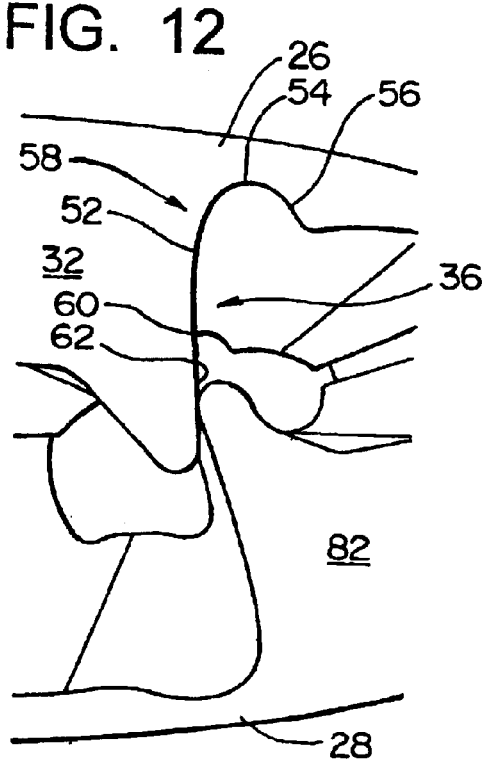
FIG. 12 shows in detail the contact surface of the master rotor.

The surfaces 36 and 38 comprise a concave and convex continuous surface with a precisely placed inflection point. As seen in FIG. 12, at the base portion of the lobe 32, the first surface 36 extends rearwardly to a first concave portion 52 then to a rearward portion 54 and the continuous surface continues forwardly to surface 56. The aforementioned concave surfaces 52, 54 and 56 are defined as the contour base surface 58.

Best seen in FIG. 12, the base surface 58 extends forwardly to an inflection point 60. At the inflection point 60, the first surface 36 transforms from a concave to a convex surface. Therefore surface 62 is a convex surface that is also adapted to receive the tip 91 of the slave lobe 82.

Figure 13:
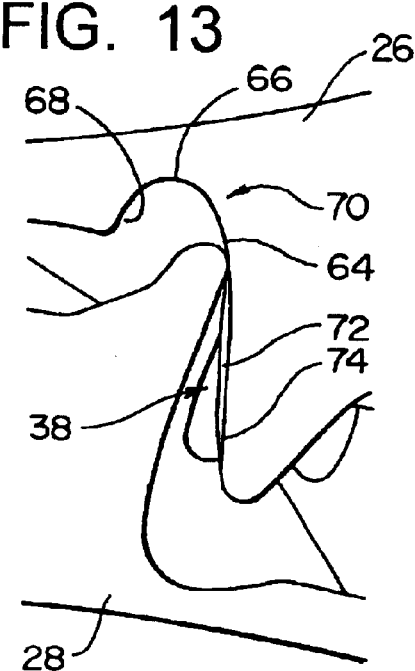
FIG. 13 is another view of one of the contact surfaces of the master rotor.

Consistent with the foregoing, FIG. 13 shows the second surface 38 extending rearwardly to a first concave portion 64 then to a rearward portion 66 and the continuous surface continues forwardly to surface 68. The aforementioned concave surfaces 64, 66 and 68 are defined as the contour base surface 70. Best seen in FIG. 13, the contour base surface 70 extends forwardly to an inflection point 72. At the inflection point 72, the first surface 38 transforms from a concave to a convex surface. Therefore surface 74 is a convex surface that is also adapted to receive the tip 93 of the slave lobe 82. A more thorough discussion of the relationships between the surfaces of the master rotor and the slave rotor will follow after a thorough description of the slave rotor.

Now referring back to FIG. 9, the rearward surface 76 is positioned between contour base surfaces 58a and 70b of lobes 32a and 32b. The rearward surface 76 does not come in contact with the slave rotor 28 but cooperates with the inner surface of the housing 22 (see FIG. 1), the outer surface of the bearing 23 and the forward surface 92 of the slave rotor 28 to define an operating chamber 105 that is further discussed herein.

There will now be a detailed discussion of the slave rotor 28 where reference is made to FIG. 9. The slave rotor 28 comprises a shaft 80 and a plurality of lobes 82. As with the description of the power rotor 26, only lobe 82a (otherwise referred to as slave lobe or second lobe) will be described in detail with the understanding this specification applies to all of the lobes 82 (where 82 collectively refers to 82a, 82b and 82c). Further, the invention is not limited to the number of lobes as shown in the preferred embodiment, but the power and slave rotors 26 and 28 will have an equal number of lobes.

As seen in FIG. 9, the slave lobes 82 comprise a spherical outer surface 84, a spherical inner surface 86 (see FIG. 11), a first surface 88, a second surface 90, and finally a forward surface 92. Further, the lobes 82 has a first tip 91 and a second tip 93. The tip 91 has a contact surface 95 and tip 93 has a contact surface 97. The contact surfaces 95 and 97 are adapted to engage surface 88 of the power rotor 26.

In a first embodiment, lobes 82 are symmetrical about the radially extending plane 94 (see FIG. 9) and hence the first surface 88 will be described in detail with the understanding the geometry and other relevant features relates to the second surface 90 has a substantially mirrored image about plane 94. It should be noted that certain symmetrical variations could be employed in the lobes 82 about plane 94.

Figure 14:
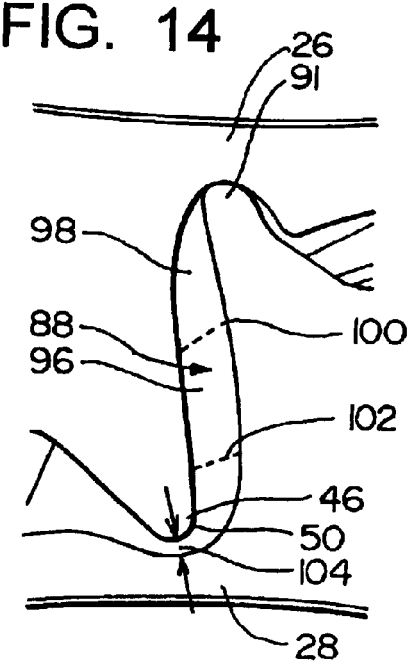
FIG. 14 illustrates the contact surface of the slave rotor.
Figure 15:
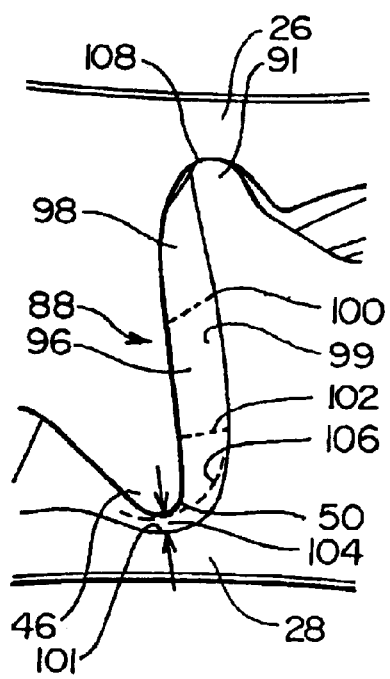
FIG. 15 is a second close-up view of the slave rotor illustrating the gap that is provided between the same of the master rotor and the rearward surface of the slave rotor.

The first surface 88 is shown in FIG. 14 where the rotor assembly 22 is in a bottom dead center position. The first surface 88 comprises a concave portion 96 and a convex portion 98. The inflection point line 100 is the location where the surface 88 transforms from a concave to a convex configuration. As seen in FIG. 15, the concave surface 96 has a forward portion 99 and a rearward base portion 101. The concave surface 96 further has a loss of fluid film seal line 102. The loss of engagement line 102 defines the point where the engagement surface 50 of the vane 46 radially repositions from the surface 88 and separates (or partially separates) the tip 46 of the power rotor 26 from the rearward base portion 101. It should be noted that the contact surface 50 and first surface 88 are not necessarily in direct contact in operation, but rather there is a thin fluid film thereinbetween. Throughout this text the term engagement when directed to a contact tip and a contour face is defined as a fluid film layer between two adjacent surfaces that provides a fluid film seal and a fluid film layer where there is not a pressure difference between the engaged surfaces. Further, engagement covers an embodiment where there is an interference fit between opposing rotors where it is desired to have the rotors forcefully engage one another to create a contact type seal. However, as a contact surface 50 rotates to the bottom dead center position as seen in FIG. 14, the annular gap 104 is produced. As shown in FIG. 15, the dashed line 106 defines a curved plane that is defined by contact surface 50 as the power rotor rotates about its axis 10a (see FIG. 11).

The perpendicular distance between curved plane 106 and rearward base surface 101 defines the annular gap 104. The distance of this gap changes with respect to the radial position θ. Hence, as shown in FIG. 16, the open area 110 is defined as the open area defined between surface 50 of the power rotor 26, surface 101 of the slave rotor 28, the housing 22 and the bearing 23. FIG. 16 shows the open area 110 has a hatched open area where the dashed line 111 indicates the perpendicular distance between contact surface 50 of vane 46 and rearward surface 101. It should be noted that rearward surface 101 has a greater radius of curvature then contact surface 50 and hence the narrowest passage between semi-chamber 113 and secondary-chamber or otherwise referred to as semi-chamber 109 (defined further herein) is open area 110. The cross-sectional area gap of open area 110 could have certain ratios with respect to the viscosity of the fluid medium that is passed therethrough. For example, if the engine 20 is designed to pump high viscosity fluids, open area 110 can be larger to allow the pressure transfer to happen quickly between semi-chambers 109 and 113. Consistent with the foregoing communication between semi chambers 113 and 121 have a similar communication means between vane 44 and the base surface 50 of the slave rotor 28.

The ratio of the distance 101 and the ratio of the contact film distance between the vane 91 and the base surface 52, 54, and 56 can be in the order of 20 to 1 in a preferred form for many fluids. This ratio is further relevant to the net cross-sectional open area 110 and the net cross-sectional area of the fluid film at location 108. A secondary range for the net cross-sectional areas can be between 30–1 and 10–1 and the ranges therein between and at certain ratios with certain fluids. In some cases much lower ratios can achieve the fluid pressure balancing between semi chambers. For this patent application, communication is defined as sufficient open area allowing a desirable pressure equalization between two rotationally adjacent semi chambers.

It should be noted that a very minimal amount of flow between the cross-sectional open area 110 is necessary to create a pressure balancing effect in some conditions. For example, at high speed and low-pressure, a very low ratio can create desirable balancing results.

The rotor assembly 24 comprises several chambers and semi-chambers. A chamber is defined as a substantially sealed and closed area where leakage of fluid from or to the chamber only occurs due to a passage through a thin fluid film layer between two surfaces. A secondary-chamber or semi chamber is defined as a cavity where two adjacent semi-chambers comprise a chamber; however, the open area 104 allows fluid passage thereinbetween.

As seen in FIG. 9 the forward surface 92 of lobe 82 and rearward surface 76 of the power rotor 26 along with the surface of the bearing and additionally the inner surface of the housing 22 (shown in FIG. 1) create a sealed chamber 105. Now referring to FIG. 16, the first surface 88 of lobe 82a and the first surface 36 of lobe 32 along with the outer surface of bearing 23 and inner surface of the housing define the first semi-chamber 109. The forward surface 42 of lobe 32 and rearward surface 51 in combination with the surface of bearing 23 and the inner surface of housing define the second semi chamber 113. Semi chamber 121 is similar to 109 except on the opposing side of the open area between two adjacent lobes of a rotor.

Figure 17:
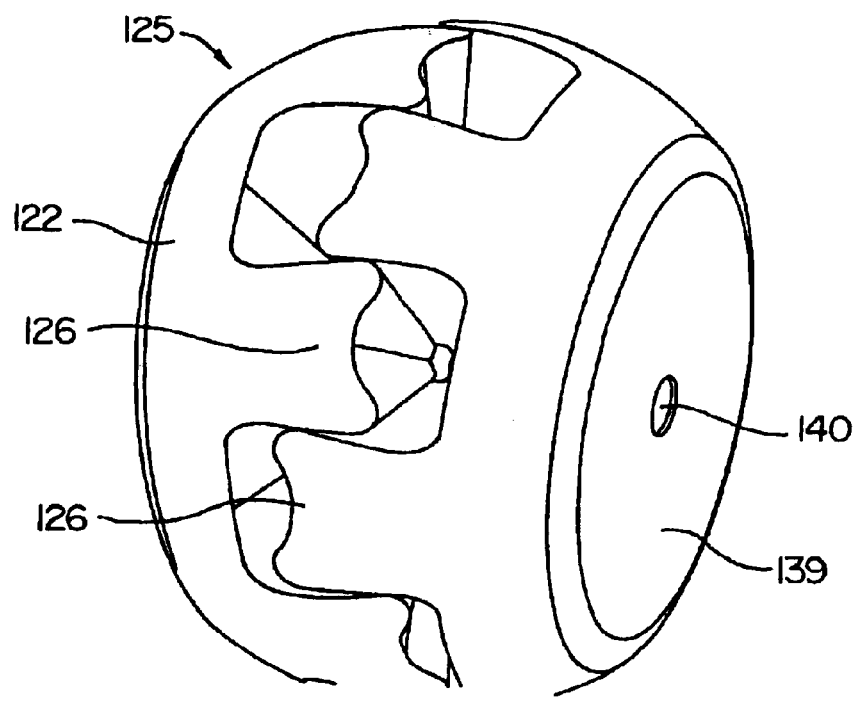
FIG. 17 is an isometric view of a symmetric rotor assembly.
Figure 18:
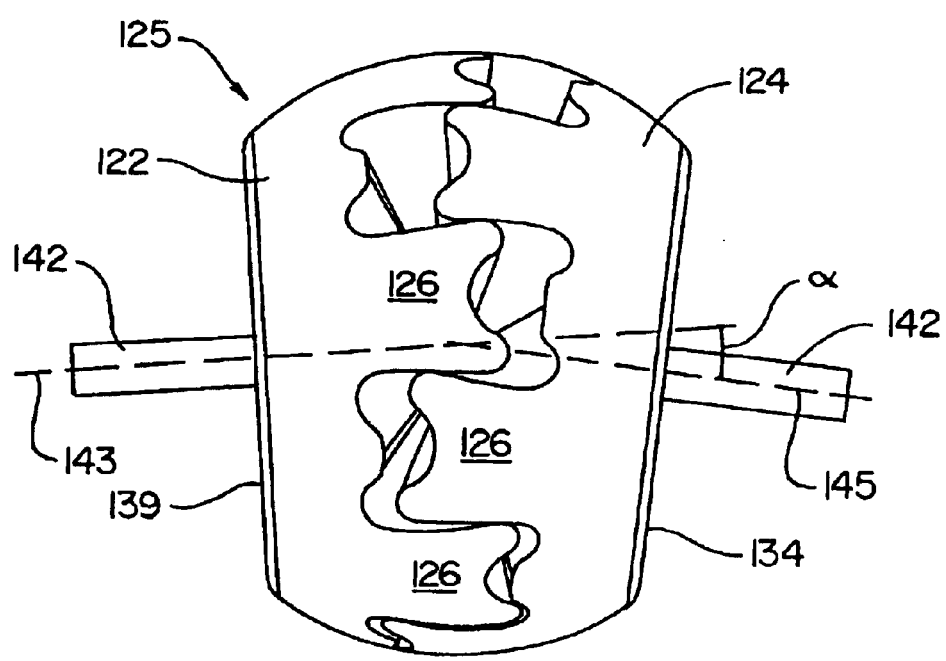
FIG. 18 is a side view of a symmetric rotor assembly.
Figure 19:
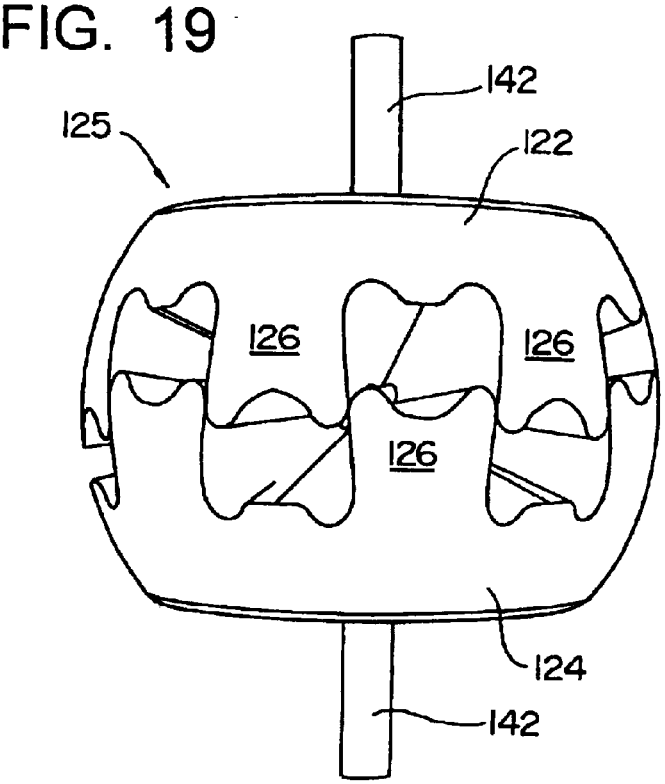
FIG. 19 is a top view of a symmetric rotor assembly.
Figure 20:
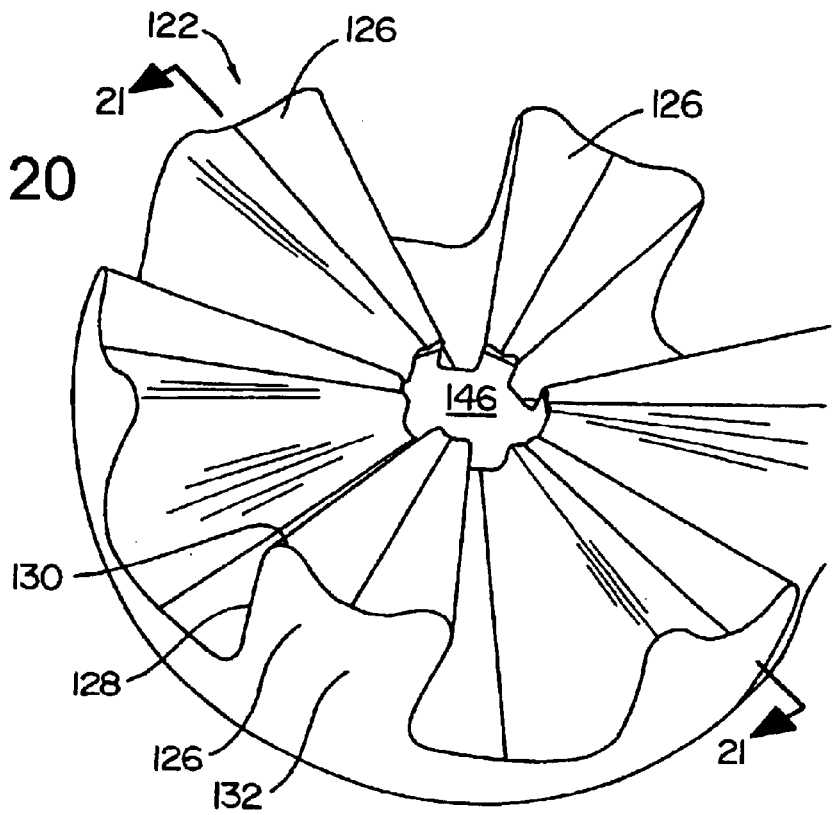
FIG. 20 is an isometric view of a symmetric rotor that is used to comprise the rotor assembly of FIGS. 17–19.
Figure 21:
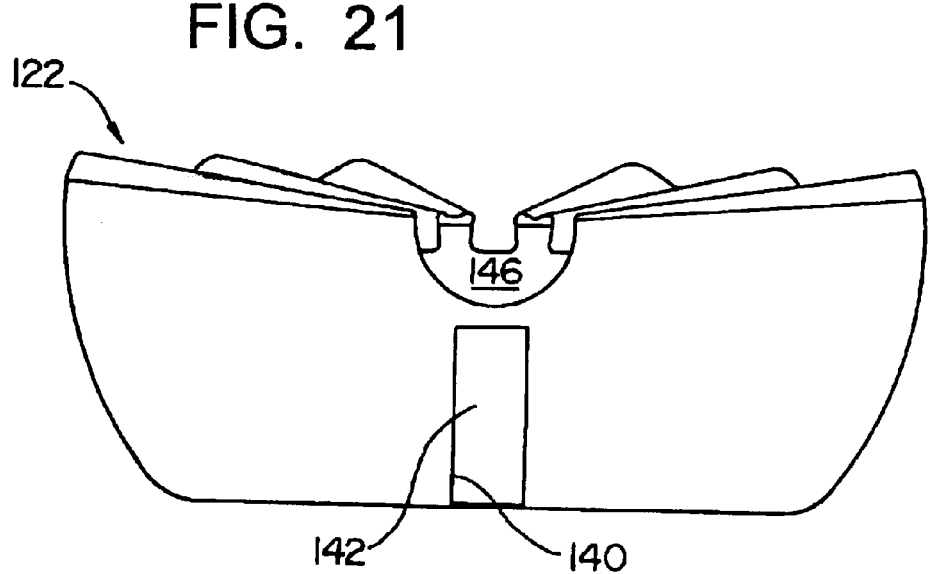
FIG. 21 is a cross-sectional view of a symmetric rotor taken at line 21—21 of FIG. 20.
Figure 22:
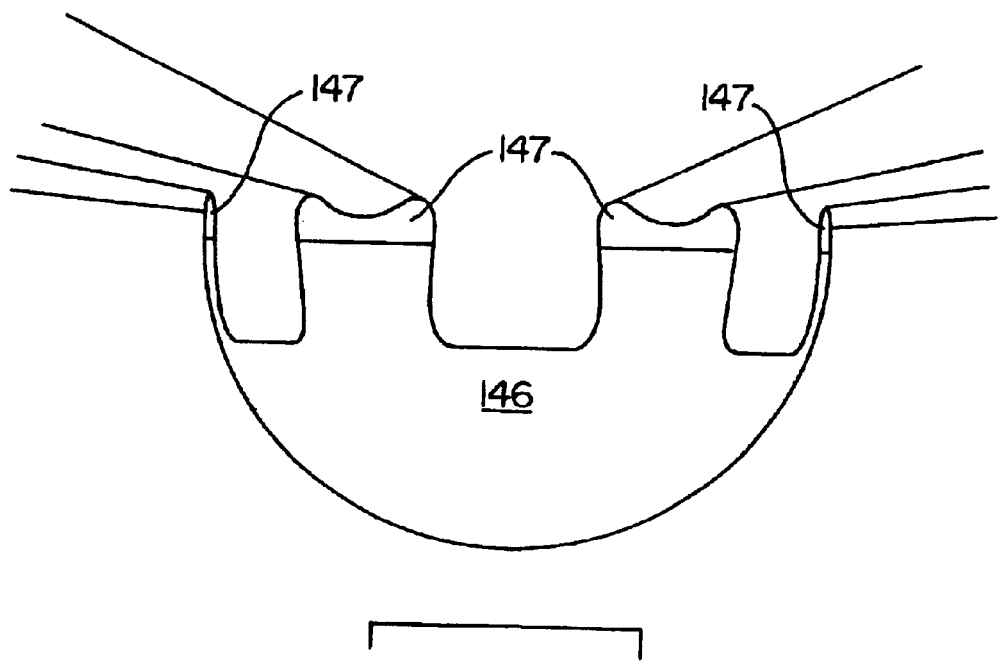
FIG. 22 is a close-up cross-sectional view showing the central cavity of the symmetric rotor.

Given the foregoing, a balanced slave rotor is advantageous for greater pressure differentials across the inlet and outlet ports. However, a preferred embodiment described below employs two identical rotors such as that shown in FIGS. 17–19. An advantage of using two identical rotors to comprise a rotor assembly is the simplicity and lower cost of manufacturing and reduction of inventory. As shown in FIG. 19, the rotor assembly 125 comprises a first rotor 122 and a second rotor 124. To eliminate redundant explanation, the first rotor 122 will be described in detail with the understanding the description is relevant to the identical rotor 124. As shown in FIG. 20, the first rotor 122 comprises a plurality of lobes 126 each lobe comprises contoured surfaces 128 and engagement tips 130 that are similar to that as described above with reference to FIGS. 1–8. Each lobe further has an outer spherical surface 132 that defines at least part of a sphere. FIG. 21 shows a cross-sectional view of the first rotor 122 and as shown in this figure the surface 140 defines a central cavity 142 that is adapted to house a support shaft. Because the flow meter has a relatively low pressure differential from the input to output ports, the shaft for the rotor can have a smaller diameter because there is less of a load placed thereon. Further, a smaller shaft is advantageous because it creates lower rotational friction. For the flow meter application low friction bearings are advantageous because they create less head loss (for low load applications such as the flow meter).

Figure 23:
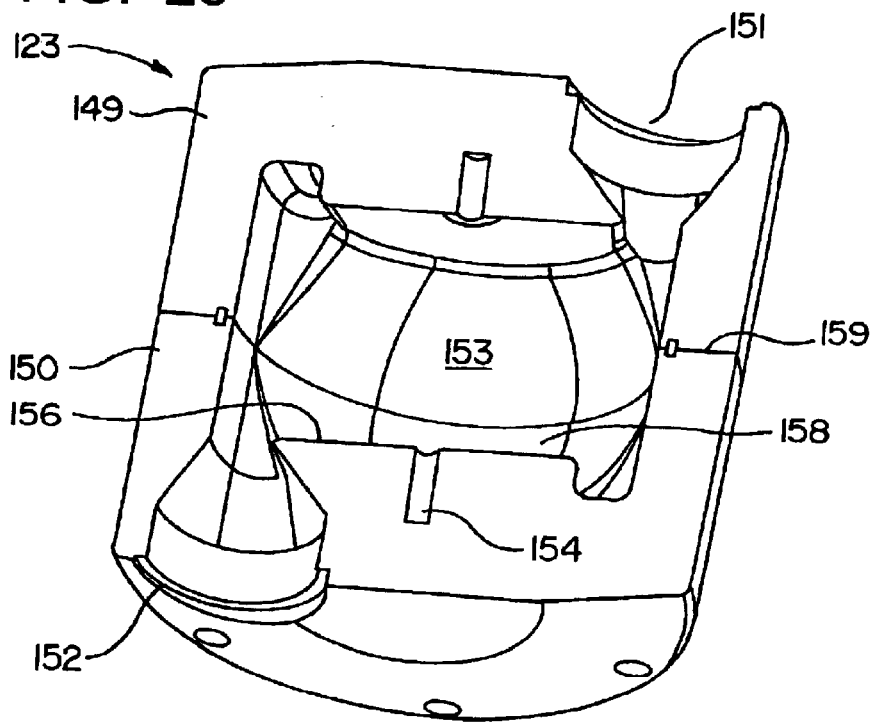
FIG. 23 is an isometric cross-sectional view of a housing of the flow meter.

FIG. 23 shows a cross-sectional view of the casing. In a preferred form, the casing (or otherwise referred to as the housing) 123 comprises two sections 149 and 150 that are identical. In general, the casing 123 comprises an input port 151 and an exit port 151. A central cavity 153 is positioned between the ports 152 and 151 and is adapted to house the rotor assembly 125. The operating fluid which the volume is measured passes through the input port 151 through the chambers of the rotor assembly is housed in the cavity 153. Therefore, casing 150 will be described in detail and the description is relevant to the casing section 149.

Figure 24:
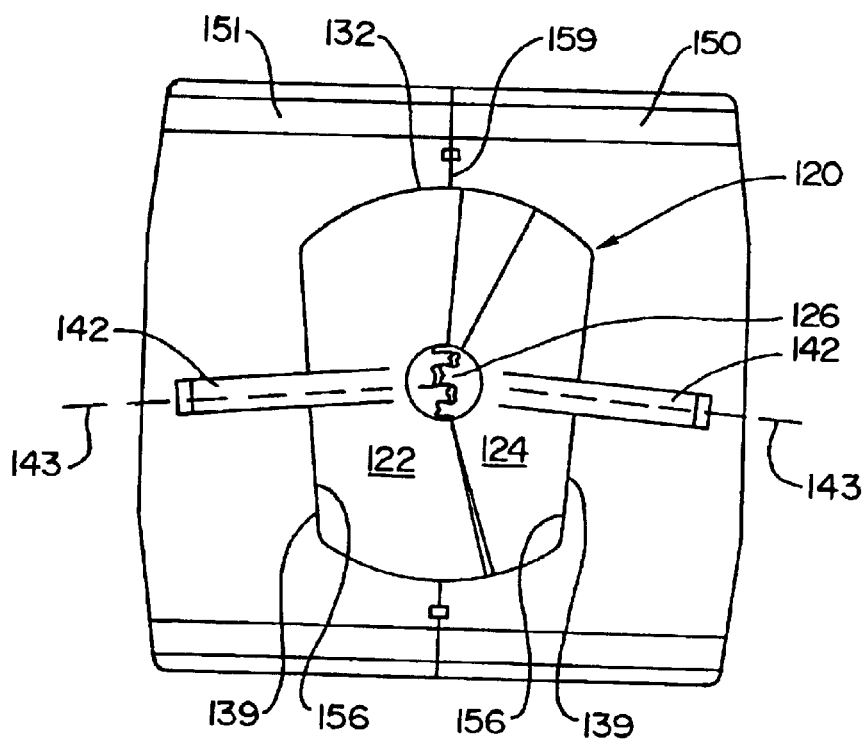
FIG. 24 is a cross-sectional view of the housing and a rotor assembly with the center sphere removed.

The casing section 150 has a port 152 that is adapted to allow fluid to pass therethrough. A cavity region 154 is adapted to house a shaft 142 of the rotor assembly 125 (see FIG. 18). As shown in FIG. 24, there is a cross-sectional view of the casing with a rotor assembly 125 housing therein. In this figure, the central ball is removed and the radially inward portion of the lobes 126 are visible. The rearward surface 139 of the rotors 122 and 124 are intimately engaged to the base surface 156 of the casing sections 150 and 151. Likewise, the radially outward surfaces of the lobes 132 are intimately engaged to the radial surface 158 of the casing sections 149 and 150. It should be noted that the portion of the rotors that overlap with the adjacent rotor must have a spherical outer surface 132. However, the portion of the rotor (and surface of the casing engaging the rotor) that is rearward from the intersecting portion of the lobes of adjacent rotors need not be spherical but should be cylindrically symmetrical.

FIG. 24 further illustrates the orientation of the rotor assembly with respects to the housing 123. In a preferred form, the central axis 143 and 145 of the first and second rotors that are offset from one another an angle alpha are symmetrically placed within the housing 123 so the central axis 143 and 145 art each an angle α/2 with respects to the central axis of the casing. In other words, the axis 143 and 145 are offset an angle α/2 from the normal to the plans substantially defining the forward surface 159 of the casing sections. This is advantageous because each casing section can be symmetrical and hence manufactured from the same process or procedure.

As shown in FIG. 1, the first embodiment would further comprise a pulse counter 127 that can be positioned on either shaft 142 or directly take a reading from either rotor 122 to or 124. For example, a magnetic conductance typing counter to take a reading of the magnetic flux shift of the rotors 122 and 124 as they rotate to a position similar to that as shown in FIG. 19. This is advantageous because the pulse counter can be attached to the exterior of the casing if the casing is made of the material that allows the magnetic flux to pass therethrough. The pulse counter can be a velocimeter that determines the rotations per unit of time.

Figure 25:
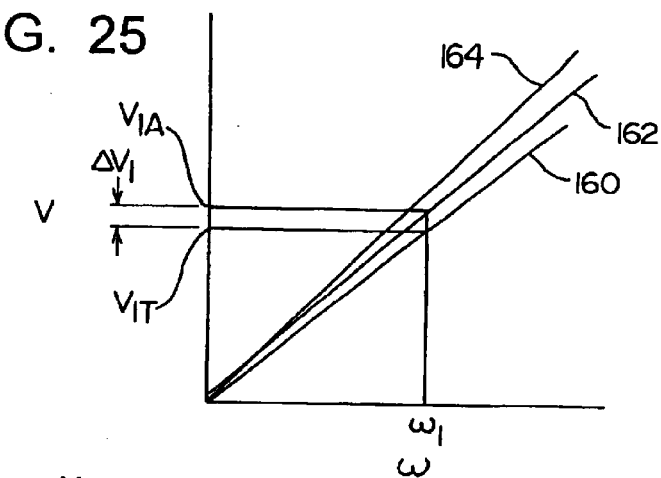
FIG. 25 is a graph illustrating the volumetric throughput of fluid with respects to rotational velocities.

As shown in FIG. 25, the graph illustrates the volumetric throughput rate at given rotational velocities ω. The line 160 is the theoretical volumetric with respects to the rotational velocity ω. However, a certain amount of fluid leaks around the outer surface 132 and the casing at top dead center and bottom dead center, between the engagement tips and the contour surfaces. In general, the fluid that is not accounted for as passing through the operating chambers but passes through the flow meter device is referred to as "blow-by". The amount of blow-by is a function of the gap tolerances between the moving parts of the flow meter, the viscosity the fluid and the differential pressure between the inlet and outlet ports. The amount of blow-by can be estimated and simply added to the calculated value of volume throughput based upon the rotations of the rotors.

As shown in FIG. 25 for a given rotational velocity the theoretical throughput of fluid is represented by line 160. However, with a slight pressure differential from the inlet and outlet ports, a certain amount of blow-by will occur in the actual fluid throughput would be a little bit higher such as represented by line 162. Therefore, for a given ω such as ω1, the actual fluid throughput $V1_a$ minus the computed input only given the rotational velocity, $V1_r$, is the amount of blow-by which is referred to as $\Delta V_1$. For a different operating fluid with lower viscosity the amount of blow-by would be greater. For example, line 164 would represent the actual fluid flow for a lower viscosity fluid.

Therefore, it can be appreciated that the value of the viscosity of the operating fluid would be a desirable property to know to estimate the value of the blow-by. In general, if the viscosity of the operating fluid is greater than the pressure differential between the inlet and outlet ports is greater for a given rotational velocity (value of ω). Therefore, given a pressure differential and a rotational velocity, the viscosity of the fluid can be calculated.

Figure 26:
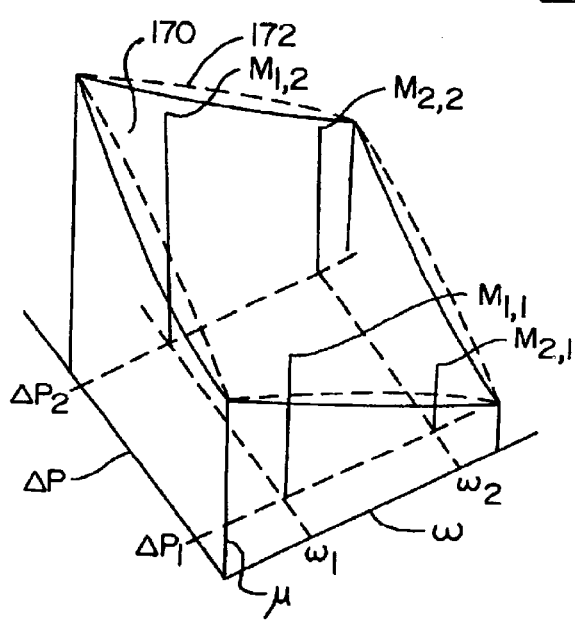
FIG. 26 is a 3-D graph showing the calculated viscosity of the operating fluid with respects to rotational velocities (ω) and pressure differentials (ΔV) of the fluid passing through the device.

Referring to FIG. 26, the three-dimensional surface 170 represents the value of the viscosity of the operating fluid with respects to the rotational velocity of the rotors (ω) and the pressure differential from the input to the output ports ($\Delta P_1$). For example, if the rotational velocity is relatively high, $\omega_2$, and the pressure differential between the inlet and outlet ports is relatively low, $\Delta P_1$, then the viscosity value $_{2,1}$ is a lower value. On the other extreme, if the rotational velocity is relatively low, a $\omega_1$, and the pressure differential is relatively high, $\Delta P_2$, then the viscosity of the operating fluid must be high $(_{1,2})$.

At a lower rotational velocity $\omega_1$ with a lower resulting pressure differential $\Delta P_1$ in intermediate value of viscosity can be calculating indicated at $_{1,1}$ and further at a higher rotational velocity $\omega_2$ with a higher pressure in intermediate value of viscosity $_{2,2}$ is calculated.

Therefore it can be appreciated that the surface 170 would preferably be determined by an empirical analysis where certain known viscosity is a fluid pass through a flow meter at several different rotational velocities and the pressure differentials will be measured and recorded. Thereafter, an equation or other function would represent the surface 170 given values of ω and ΔP. The surface could look similar to that as shown by the dashed peripheral lines 172. The important factor is that the viscosity is calculated is determined by ΔP and ω.

Once the viscosity for the fluid has been determined given the pressure differential and the viscosity, the blow-by can be calculated based upon a theoretical or empirical analysis based equation using the viscosity and the pressure differential variables.

Figure 27:
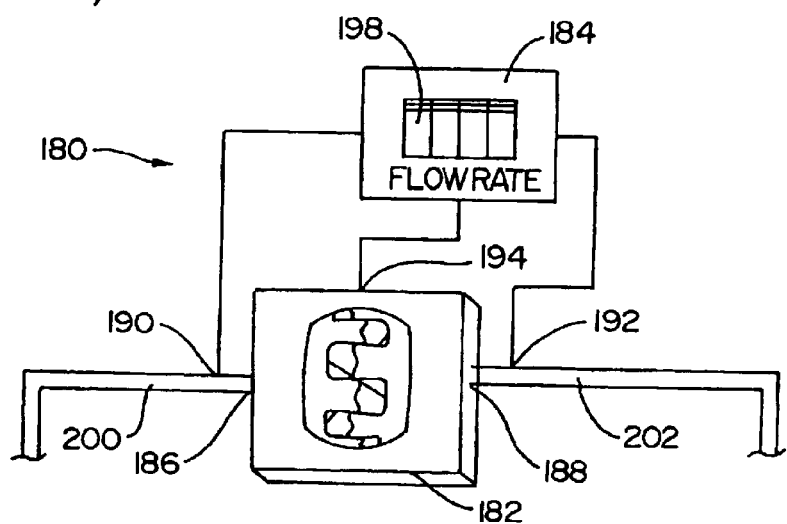
FIG. 27 is a schematic view illustrating a second embodiment of the present invention.

FIG. 27 is a schematic view illustrating the underlying principles of the second embodiment of the present invention. In general, the second embodiment 180 comprises a rotor casing assembly 182 and a processing portion 184. The rotor casing 182 showing the schematic rotors in FIG. 27 comprises an input port 186 and an out port 188. Three sensors are employed, two pressure sensors and a rotational sensor. The first and second pressure sensors are schematically indicated at 190 and 192 and are adapted to read the static pressure of the input and output lines 200 and 202. The rotational sensor schematically indicated at 194 and the first and second pressure sensors 190 and 192 feed inputs processing portion 184. Processor 184 decodes the signals into numeric values to calculate the flow rate. As described above, the equation for precisely calculating the flow rate would take into consideration the rate of rotation of the rotors to determine the volumetric throughput to the chambers to obtain a first value. Then the pressure differential between the first and second sensors 198 and 192 and the rotational velocity indicated by sensor 194 are used to determine the viscosity of the fluid. The viscosity of the fluid and the pressure differential are used to calculate a second value, the amount of blow-by. The first and second values total the net volume throughput.

The processor 184 would preferably have a display portion 196 to indicate the flow rate or total flow. Of course FIG. 27 is a schematic figure illustrating the general principles and the rotor assembly where a production model would preferably have the sensors and display unit integrated with the casing.

Figure 28:
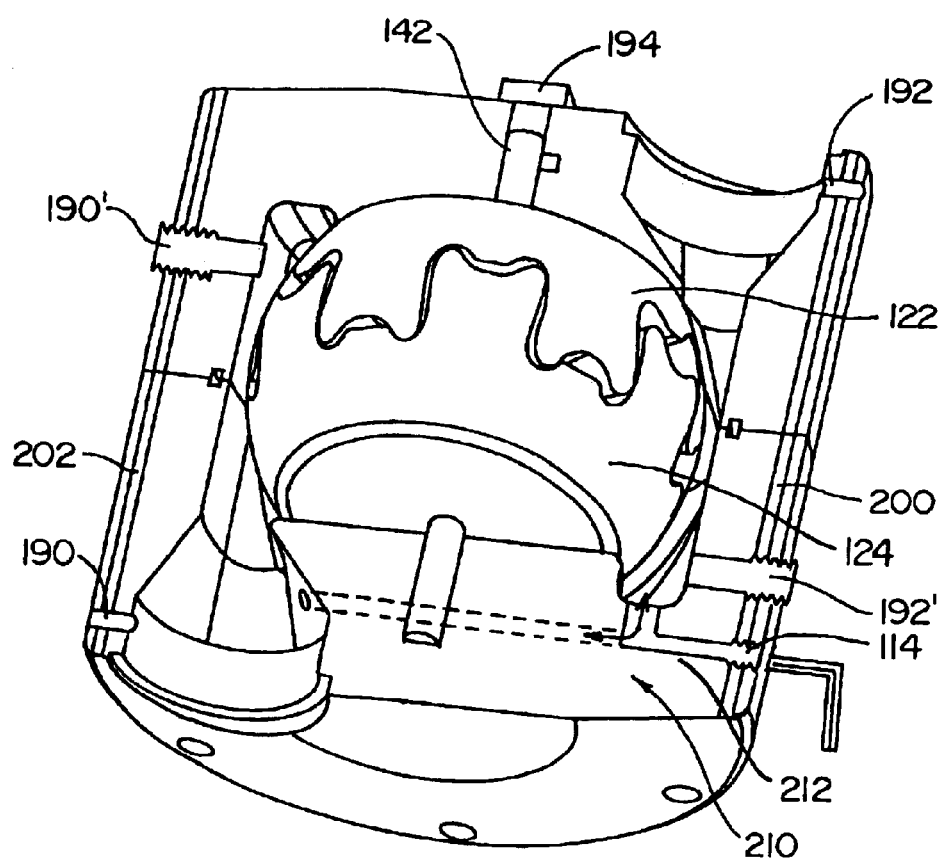
FIG. 28 is a partial cross-sectional view showing the second embodiment of the present invention.

FIG. 28 shows the second embodiment of the present invention where a first pressure sensor 186 and a second pressure sensor 188 are embedded in the casing with the inlet and the outlet ports respectively. The rotational counter 194 tracks a number of rotations of the shaft 142. The output from the pressure sensor is 186 and 188 can extend through passageways 200 and 202 that can be openings or electrical conduits to pass a current. Alternatively, the pressure can be measured at ports 190' and 192'. The above described calculation of determining the blow-by can be executed on a computer chip or through mechanical means where mechanical type sensors would indicate the pressure and rotational speed and a linkage system would indicate the amount of blow-by.

The embodiment as shown in FIG. 28 further employs a balanced rotor assembly where the rotor 122' is designed in a manner as described in FIGS. 9–16. As shown in FIG. 28 the tips of the lobe of the rotor 124' at bottom dead center to not come in contact with the base portion in between the lobes of the rotor 122'. Therefore, the rotor 122 is rotationally balanced and 'floats' about its axis of rotation.

FIG. 28 shows a further modification showing a shunt assembly. The shunt assembly 210 comprises a first passageway 211 that is a communication between the inlet port 152 and the exit port 151. A flow restriction portion 212 adjusts the fluid resistance between the inlet and outlet port. In a preferred form, a needle valve or proportional valve 114 can be employed. In one form, it would be preferable to only have this valve only accessible at the manufacturing site of the flow meter of the present invention so the end user would not tamper with the setting of the fluid restrictor 214. To calibrate the shunt system, the rotors are rotated at a specific speed (caused to spin at a predetermined speed). A set fluid at a set temperature at a set pressure is then directed through the flow meter. The exact volumetric throughput of the fluid is known and the shunt system is adjusted so the output reading of the flow meter corresponds to the exact volumetric throughput.

A micro flow parameter can be in the controller where as shown in FIG. 25 at zero rotational velocity with a pressure differential there will be a small amount of seepage (blowby). In this case, the pressure differential is so slight that it is not sufficient to rotate the rotors. Although the low friction rotors rotate at very low pressure differentials, in some applications rotational resistance such as higher friction bearings may cause more resistance to rotation. In this case, the micro flow can be accounted for in the controller where a condition is set that if the rotational velocity is zero and the pressure differential is positive (i.e. higher on the outlet port than the inlet port) than the microcontroller will employ a second equation that would account for the seepage past the rotors and the casing for the given pressure differential. In a preferred form, the last recorded viscosity of the fluid would be used to calculate the seepage flow.

A temperature parameter can also be added by using one or two temperature transducers and using this information to account for dimensional changes of the casing and rotors. Temperature also affects the viscosity of fluids, but the viscosity change of the fluid due to temperature (or any other variable) will already be accounted for by the viscometer computation which does not require a temperature input.

The effect of temperature would seem to be minor compared to the effects of viscosity, flow rate and system pressure due to the fact that all parts should expand at a similar rate. Accounting for temperature would require one or two thermocouples and an alteration to the control equation. Temperature could also be compensated for by matching (or intentionally mismatching) the rotors and casing so the gap clearance does not change significantly as the parts expand or contract due to changes in temperature of the fluid or the environment. It should be noted that larger gap clearances will make the flow meter more tolerant to temperature variations. It should further be noted that many of the various corner portions throughout the various embodiments have tapered corners to allow more desirable fluid flow therearound.

The cost of manufacturing is reduced to have looser clearances and tolerances. The consistencies from flow meter to flow meter will be greater because any inconsistency between the manufactured part will have a lower percentage effect upon the total gap clearance. For example, if the tolerances were plus or minus one thousandths of an inch, a ten thousandths of an inch gap will have less of a percentage gap variance than a three thousandths of an inch gap.

The flow meter can be employed where the rotors are used in other engine embodiments (a device that transfers energy such as a motor or a compressor for example).

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

Therefore I claim:

1. A flow meter adapted to measure the amount of a fluid passing therethrough, the flow meter comprising:
 a housing comprising an inner surface and an inlet port and an exit port;
 an inner component have an outer surface that defines at least part of a sphere;
 a first rotor mounted for rotation in the housing about a first axis and having a forward region and a rearward region and a first outer surface defining at least part of a sphere and adapted to intimately engages the inner surface of the housing;
 a second rotor having a forward portion and a rearward portion, mounted for rotation in the housing about a second axis offset from being collinear with the first axis by an angle α and intersecting at the common centers of the rotors, the second rotor including a second inner surface defining at least part of a sphere having a common center with the center of the first rotor and is adapted to engage the said inner component, a second outer surface defining at least part of a sphere and having a common center with the second inner surface and adapted to engage the inner surface of the housing;
 the said first rotor further having a first contour surface that is defined by a locus formed by points on the second rotor as the second rotor rotates about the second axis, and the first rotor further has a first engagement tip which is positioned in the forward region of the first rotor;
 the second rotor further having a second engagement surface that is defined by a locus formed by points on the first rotor as the first rotor rotates about the first axis, the second engagement surface having a base region;
 the points of each rotor that define the locus lie along an outer edge of a central axis is essentially a radius extending outward from the common centers of the rotor at an angle α/2 from a normal to the axis of the other rotor;
 a counter engaged to at least one of the said rotors where the counter is adapted to count the number of rotations of the rotors;
 whereas the contour surfaces of the first and second rotors define operating chambers that change in volume with respects to rotation of the first and second rotors where a certain amount of fluid passes from the inlet port to the outlet port per revolution of the first and second rotors and the counter indicates the number of rotations to calculate the amount of fluid passing through the flow meter.

2. The flow meter as recited in claim 1 further comprising a display interface that indicates the number of rotations of the first and second rotor.

3. The flow meter as recited in claim 1 where a first volumetric value is a product of a volume per rotation coefficient that is the volumetric throughput per revolution of the first and second rotors and the number of rotations.

4. The flow meter as recited in claim 3 further comprising an output component that posts the first volumetric value of the flow meter.

5. The flow meter as recited in claim 4 where the volumetric throughput through the input port to the output port to the flow meter is measured for given unit of time and the output portion produces the volumetric flow rate.

6. The flow meter as recited in claim 3 further comprising;
a pressure differential system that measures the differential pressure from the input port to the output port;
a velocimeter that is in communication with the counter and indicates the number of rotations per unit of time and outputs a rotational velocity of the rotors and determines the fluid flow rate of the fluid passing therethrough;
whereas the pressure differential and the rotational velocity are used to determine the volumetric quantity of blow-by.

7. The flow meter as recited in claim 6 where the volumetric quantity of blow-by is added to the first volumetric quantity to represent the total volumetric throughput from the inlet port to the output port.

8. The flow meter as recited in claim 6 above where the volumetric quantity of blow-by is divided by a unit of time to produce a blow-by volumetric throughput rate value.

9. A method of measuring the flow of the fluid comprising the steps of:
channeling the fluid through an input port of the flow meter device that comprises:
a housing comprising an inner surface and the said input port and an exit port;
an inner component have an outer surface that defines at least part of a sphere;
a first rotor mounted for rotation in the housing about a first axis and having a forward region and a rearward region and a first outer surface defining at least part of a sphere and adapted to intimately engage the inner surface of the housing;
a second rotor having a forward portion and a rearward portion, mounted for rotation in the housing about a second axis offset from being collinear with the first axis by an angle α and intersecting at the common centers of the rotors, the second rotor including a second inner surface defining at least part of a sphere having a common center with the center of the first rotor and is adapted to engage the said inner component, a second outer surface defining at least part of a sphere and having a common center with the second inner surface and adapted to engage the inner surface of the housing;
the said first rotor further having a first contour surface that is defined by a locus formed by points on the second rotor as the second rotor rotates about the second axis, and the first rotor further has a first engagement tip which is positioned in the forward region of the first rotor;
the second rotor further having a second engagement surface that is defined by a locus formed by points on the first rotor as the first rotor rotates about the first axis, the second engagement surface having a base region;
the points of each rotor that define the locus lie along an outer edge of a central axis is essentially a radius extending outward from the common centers of the rotor at an angle α/2 from a normal to the axis of the other rotor;
a counter engaged to at least one of the said rotors where the counter is adapted to count the number of rotations of the rotors;
whereas the volumetric throughput of the fluid is a product of the number of rotations and the volume for rotation coefficient of the flow meter device.

10. The method as recited in claim 9 where a first volumetric value is a product of a volume per rotation coefficient that is the volumetric throughput per revolution of the first and second rotors and the number of rotations.

11. The method as recited in claim 10 further comprising an output component that posts the first volumetric value.

12. The method as recited in claim 11 volumetric throughput through the input port to the output port is measured for given unit of time and the output portion produces the volumetric flow rate.

13. The method as recited in claim 10 where a pressure differential system that measures the differential pressure from the input port to the output port is in communication with the input and output ports, a velocimeter is used that is in communication with the counter and indicates the number of rotations per unit of time and outputs a rotational velocity of the rotors, where the pressure differential and the rotational velocity are used to determine the volumetric quantity of blow-by.

14. The method as recited in claim 13 where the volumetric quantity of blow-by is added to the first volumetric quantity to represent the total volumetric throughput from the inlet port to the output port.

15. The method as recited in claim 14 where the volumetric quantity of blow-by is divided by a unit of time to produce a blow-by volumetric throughput rate value.

* * * * *